United States Patent
Zhang et al.

(10) Patent No.: US 10,985,878 B2
(45) Date of Patent: Apr. 20, 2021

(54) TRANSPORT BLOCK SIZE, SOFT CHANNEL BIT BUFFER SIZE, AND RATE MATCHING FOR SHORT TRANSMISSION TIME INTERVALS

(71) Applicant: QUALCOMM Incorporated, San Diego, CA (US)

(72) Inventors: Wenshu Zhang, San Diego, CA (US); Amir Farajidana, Sunnyvale, CA (US); Seyedkianoush Hosseini, San Diego, CA (US); Shashank Maiya, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 16/153,817

(22) Filed: Oct. 7, 2018

(65) Prior Publication Data

US 2019/0109676 A1    Apr. 11, 2019

Related U.S. Application Data

(60) Provisional application No. 62/570,074, filed on Oct. 9, 2017.

(51) Int. Cl.
*H04W 4/00* (2018.01)
*H04L 1/18* (2006.01)
(Continued)

(52) U.S. Cl.
CPC .......... *H04L 1/1835* (2013.01); *H04L 1/1812* (2013.01); *H04L 5/0048* (2013.01);
(Continued)

(58) Field of Classification Search
CPC ... H04L 1/1835; H04L 1/1812; H04L 5/0048; H04L 5/0055; H04L 5/0057; H04L 5/001; H04L 72/0446; H04L 72/14
See application file for complete search history.

(56) References Cited

U.S. PATENT DOCUMENTS

2019/0053230 A1*  2/2019  Andersson ............ H04L 1/1887
2019/0268096 A1*  8/2019  Takeda .................. H04L 1/0068
(Continued)

OTHER PUBLICATIONS

Huawei (R1-1712073, HARQ processes handling to support dynamic switching between 1ms TTI and sTTI, Prague, Czech Republic, Aug. 21-25, 2017) (Year: 2017).*
(Continued)

*Primary Examiner* — Maharishi V Khirodhar
(74) *Attorney, Agent, or Firm* — Holland & Hart LLP/QUALCOMM Incorporated

(57) ABSTRACT

Methods, systems, and devices for wireless communications are described. In some systems, base stations may transmit downlink transmissions in transmission time intervals (TTIs) or short TTIs (sTTIs). The base stations and user equipment (UE) receiving the downlink transmissions may be configured to determine a transport block size, soft channel bit buffer size, or rate matching based on the sTTI. The transport block size may be selected based on a scaling factor associated with signaling overhead or a type, length, or index of sTTI, or based on an sTTI transport block size table. The buffer size may be selected based on scaling or not scaling a buffer size value associated with a TTI. UEs may handle receiving retransmissions of downlink transmissions in different length TTIs, and base stations may select channel quality indicator-to-modulation and coding scheme mappings on an sTTI-by-sTTI basis.

16 Claims, 23 Drawing Sheets

(51) Int. Cl.
  *H04W 72/14* (2009.01)
  *H04L 5/00* (2006.01)
  *H04W 72/04* (2009.01)

(52) U.S. Cl.
  CPC .......... *H04L 5/0055* (2013.01); *H04L 5/0057* (2013.01); *H04W 72/0446* (2013.01); *H04W 72/14* (2013.01); *H04L 5/001* (2013.01)

(56) References Cited

U.S. PATENT DOCUMENTS

2019/0356426 A1* 11/2019 He .................. H04L 1/1822
2020/0028635 A1*  1/2020 Lee ................. H04W 80/08

OTHER PUBLICATIONS

LG electronics, R1-1713066, Dynamic switching between 1ms TTI and sTTI, Prague, Czech Republic, Aug. 21-25, 2017, (Year: 2017).*

LG Electronics: "Discussion on Supporting Dynamic Switching between 1 ms TTI and sTTI," 3GPP Draft; R1-1704826, Dynamic Switching TTI and STTI, 3rd Generation Partnership Project (3GPP), Mobile Competence Centre; 650, Route Des Lucioles; F-06921, Sophia-Antipolis Cedex; France, vol. RAN WG1, No. Spokane, USA; Apr. 3-Apr. 7, 2017, Mar. 25, 2017, XP051251516, 3 pages, Retrieved from the Internet: URL: http://www.3gpp.org/ftp/tsg_ran/WG1_RL1/TSGR1_88b/Docs/ [retrieved on Mar. 25, 2017].

Partial International Search Report—PCT/US2018/054878—ISA/EPO—dated Jan. 21, 2019(180190WO).

Samsung: "Remaining Issues for Dynamic Switching between 1ms TTI and sTTI," 3GPP Draft; R1-1717531—Remaining Issues for Dynamic Switching between 1 MS TTI and STTI, 3rd Generation Partnership Project (3GPP), Mobile Competence Centre; 650, Route Des Lucioles; F-06921 Sophia, vol. RAN WG1, No. Prague, CZ; Oct. 9-Oct. 13, 2017, Oct. 8, 2017, XP051340718, 3 pages, Retrieved from the Internet: URL: http://www.3gpp.org/ftp/Meetings_3GPP_SYNC/RAN1/Docs/ [retrieved on Oct. 8, 2017].

International Search Report and Written Opinion—PCT/US2018/054878—ISA/EPO—dated Mar. 19, 2019 (180190WO).

* cited by examiner

TRANSPORT BLOCK SIZE, SOFT CHANNEL BIT BUFFER SIZE, AND RATE MATCHING FOR SHORT TRANSMISSION TIME INTERVALS

CROSS REFERENCES

The present application for patent claims the benefit of U.S. Provisional Patent Application No. 62/570,074 by ZHANG, et al., entitled "TRANSPORT BLOCK SIZE, SOFT CHANNEL BIT BUFFER SIZE, AND RATE MATCHING FOR SHORT TRANSMISSION TIME INTERVALS," filed Oct. 9, 2017, assigned to the assignee hereof, and which is expressly incorporated herein, in its entirety.

BACKGROUND

The following relates generally to wireless communication, and more specifically to determining transport block size, soft channel bit buffer size, and rate matching for short transmission time intervals (sTTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may transmit downlink transmissions to a UE in a physical downlink shared channel (PDSCH). In some cases, the base station may transmit the downlink transmissions in transmission opportunities of varying lengths, including shortened PDSCH (sPDSCH) transmissions. The different lengths of transmissions may cause challenges for the base station and UE to encode or decode these downlink transmissions efficiently.

SUMMARY

The described techniques relate to improved methods, systems, devices, or apparatuses that support determining transport block size, soft channel bit buffer size, and rate matching for short transmission time intervals (sTTIs). Generally, the described techniques provide for a base station transmitting one or more downlink transmissions in sTTIs. The sTTIs may be shorter than a 1 millisecond (ms) transmission time interval (TTI), which may be referred to as a "legacy" TTI or subframe. The base station may additionally transmit a downlink grant indicating a resource block allocation and modulation and coding scheme (MCS) for decoding the downlink transmission. The base station and a user equipment (UE) receiving the downlink transmission may be configured to determine a transport block size, soft channel bit buffer size, and rate matching based on the sTTI. For example, the base station and UE may select the transport block size based on a scaling factor associated with signaling overhead, a scaling factor associated with a type, length, or index of the sTTI for downlink transmission, or an sTTI type-specific transport block size table. Similarly, the base station and UE may select the soft channel bit buffer size based on comparing a soft channel bit buffer size value, N_IR, to a virtual buffer size corresponding to the transport block size. The value of N_IR for sTTIs may either be a scaled or unscaled version of an N_IR value corresponding to a "legacy" TTI. In some cases, the base station and UE may handle receiving retransmissions of a downlink transmission in different length TTIs (e.g., 2 symbol, 3 symbol, 1 slot, or 1 subframe TTIs). Additionally or alternatively, the base station may maintain or adjust a channel quality indicator (CQI)-to-MCS mapping for the downlink transmission on an sTTI-by-sTTI basis.

A method of wireless communication is described. The method may include receiving a downlink grant for a downlink transmission in an sTTI, the sTTI corresponding to one of a plurality of sTTI position indexes within a TTI, and the downlink grant comprising a resource block allocation for the downlink transmission. The method may further include receiving the downlink transmission over the sTTI, determining a transport block size for the downlink transmission based at least in part on scaling the resource block allocation by a scaling factor corresponding to an index of the sTTI within the plurality of sTTI position indexes, and applying the scaled resource block allocation to a transport block size table associated with the TTI, and decoding the downlink transmission according to the determined transport block size.

An apparatus for wireless communication is described. The apparatus may include means for receiving a downlink grant for a downlink transmission in an sTTI, the sTTI corresponding to one of a plurality of sTTI position indexes within a TTI, and the downlink grant comprising a resource block allocation for the downlink transmission. The apparatus may further include means for receiving the downlink transmission over the sTTI, means for determining a transport block size for the downlink transmission based at least in part on scaling the resource block allocation by a scaling factor corresponding to an index of the sTTI within the plurality of sTTI position indexes, and applying the scaled resource block allocation to a transport block size table associated with the TTI, and means for decoding the downlink transmission according to the determined transport block size.

Another apparatus for wireless communication is described. The apparatus may include a processor, memory in electronic communication with the processor, and instructions stored in the memory. The instructions may be operable to cause the processor to receive a downlink grant for a downlink transmission in an sTTI, the sTTI corresponding to one of a plurality of sTTI position indexes within a TTI, and the downlink grant comprising a resource block allocation for the downlink transmission. The instructions may be further operable to cause the processor to receive the downlink transmission over the sTTI, determine a transport block size for the downlink transmission based at least in part on scaling the resource block allocation by a scaling factor corresponding to an index of the sTTI within the plurality of sTTI position indexes, and applying the scaled resource block allocation to a transport block size table associated with the TTI, and decode the downlink transmission according to the determined transport block size.

A non-transitory computer-readable medium for wireless communication is described. The non-transitory computer-readable medium may include instructions operable to cause a processor to receive a downlink grant for a downlink transmission in an sTTI, the sTTI corresponding to one of a plurality of sTTI position indexes within a TTI, and the downlink grant comprising a resource block allocation for the downlink transmission. The instructions may be further operable to cause the processor to receive the downlink transmission over the sTTI, determine a transport block size for the downlink transmission based at least in part on scaling the resource block allocation by a scaling factor corresponding to an index of the sTTI within the plurality of sTTI position indexes, and applying the scaled resource block allocation to a transport block size table associated with the TTI, and decode the downlink transmission according to the determined transport block size.

In some examples of the method, apparatus, and non-transitory computer-readable medium described above, the scaling factor further corresponds to a control format indicator (CFI), a cell-specific reference signal (CRS) overhead, a demodulation reference signal (DMRS) overhead, a broadcast signal overhead, a hybrid automatic repeat request (HARQ) turnaround processing time, or any combination thereof.

Another method of wireless communication is described. The method may include receiving a downlink grant for a downlink transmission in an sTTI, the sTTI corresponding to one of a plurality of sTTI position indexes within a TTI, and the downlink grant comprising a resource block allocation for the downlink transmission. The method may further include receiving the downlink transmission over the sTTI, determining a transport block size for the downlink transmission based at least in part on a transport block size table associated with the sTTI, and decoding the downlink transmission according to the determined transport block size.

An apparatus for wireless communication is described. The apparatus may include means for receiving a downlink grant for a downlink transmission in an sTTI, the sTTI corresponding to one of a plurality of sTTI position indexes within a TTI, and the downlink grant comprising a resource block allocation for the downlink transmission. The apparatus may further include means for receiving the downlink transmission over the sTTI, means for determining a transport block size for the downlink transmission based at least in part on a transport block size table associated with the sTTI, and means for decoding the downlink transmission according to the determined transport block size.

Another apparatus for wireless communication is described. The apparatus may include a processor, memory in electronic communication with the processor, and instructions stored in the memory. The instructions may be operable to cause the processor to receive a downlink grant for a downlink transmission in an sTTI, the sTTI corresponding to one of a plurality of sTTI position indexes within a TTI, and the downlink grant comprising a resource block allocation for the downlink transmission. The instructions may be further operable to cause the processor to receive the downlink transmission over the sTTI, determine a transport block size for the downlink transmission based at least in part on a transport block size table associated with the sTTI, and decode the downlink transmission according to the determined transport block size.

A non-transitory computer-readable medium for wireless communication is described. The non-transitory computer-readable medium may include instructions operable to cause a processor to receive a downlink grant for a downlink transmission in an sTTI, the sTTI corresponding to one of a plurality of sTTI position indexes within a TTI, and the downlink grant comprising a resource block allocation for the downlink transmission. The instructions may be further operable to cause the processor to receive the downlink transmission over the sTTI, determine a transport block size for the downlink transmission based at least in part on a transport block size table associated with the sTTI, and decode the downlink transmission according to the determined transport block size.

Some examples of the method, apparatus, and non-transitory computer-readable medium described above may further include processes, features, means, or instructions for selecting the transport block size table from a plurality of transport block size tables according to a length of the sTTI or an index of the sTTI.

In some examples of the method, apparatus, and non-transitory computer-readable medium described above, the transport block size table may be selected based at least in part on a CFI, a CRS overhead, a DMRS overhead, a broadcast signal overhead, a HARQ turnaround processing time, or any combination thereof.

In some examples of the method, apparatus, and non-transitory computer-readable medium described above, determining the transport block size for the downlink transmission may further comprise scaling the resource block allocation by a scaling factor corresponding to an index of the sTTI within the plurality of sTTI position indexes, and applying the scaled resource block allocation to the transport block size table associated with the sTTI.

A further method of wireless communication is described. The method may include receiving one or more downlink transmissions in one or more sTTIs, each of the sTTIs corresponding to one of a plurality of sTTI position indexes within one or more TTIs, determining a transport block size for a transport block of the one or more downlink transmissions, determining a soft channel bit buffer size associated with the transport block based on the transport block size and a maximum soft channel bit buffer size associated with the TTI, and decoding the one or more downlink transmissions according to the determined transport block size and soft channel bit buffer size.

An apparatus for wireless communication is described. The apparatus may include means for receiving one or more downlink transmissions in one or more sTTIs, each of the sTTIs corresponding to one of a plurality of sTTI position indexes within one or more TTIs, means for determining a transport block size for a transport block of the one or more downlink transmissions, means for determining a soft channel bit buffer size associated with the transport block based on the transport block size and a maximum soft channel bit buffer size associated with the TTI, and means for decoding the one or more downlink transmissions according to the determined transport block size and soft channel bit buffer size.

Another apparatus for wireless communication is described. The apparatus may include a processor, memory in electronic communication with the processor, and instructions stored in the memory. The instructions may be operable to cause the processor to receive one or more downlink transmissions in one or more sTTIs, each of the sTTIs corresponding to one of a plurality of sTTI position indexes within one or more TTIs, determine a transport block size for a transport block of the one or more downlink transmissions, determine a soft channel bit buffer size associated with the transport block based on the transport block size and a maximum soft channel bit buffer size associated with the TTI, and decode the one or more downlink transmissions according to the determined transport block size and soft channel bit buffer size.

A non-transitory computer-readable medium for wireless communication is described. The non-transitory computer-readable medium may include instructions operable to cause a processor to receive one or more downlink transmissions in one or more sTTIs, each of the sTTIs corresponding to one of a plurality of sTTI position indexes within one or more TTIs, determine a transport block size for a transport block of the one or more downlink transmissions, determine a soft channel bit buffer size associated with the transport block based on the transport block size and a maximum soft channel bit buffer size associated with the TTI, and decode the one or more downlink transmissions according to the determined transport block size and soft channel bit buffer size.

Some examples of the method, apparatus, and non-transitory computer-readable medium described above may further include processes, features, means, or instructions for determining a level of precision at which to store, in a soft channel bit buffer, a plurality of soft channel bits associated with the one or more downlink transmissions.

In some examples of the method, apparatus, and non-transitory computer-readable medium described above, decoding the one or more downlink transmissions may further comprise storing, in the soft channel bit buffer, the plurality of soft channel bits associated with the one or more downlink transmissions at the determined level of precision, the determined level of precision being full precision, wherein a size of the soft channel bit buffer is equal to the soft channel bit buffer size.

In some examples of the method, apparatus, and non-transitory computer-readable medium described above, decoding the one or more downlink transmissions may further comprise storing, in the soft channel bit buffer, the plurality of soft channel bits associated with the one or more downlink transmissions at the determined level of precision, the determined level of precision being reduced precision, wherein a size of the soft channel bit buffer is equal to the soft channel bit buffer size.

Some examples of the method, apparatus, and non-transitory computer-readable medium described above may further include processes, features, means, or instructions for identifying that an aggregate of soft channel bit buffer sizes for a plurality of HARQ processes may be greater than a threshold. Some examples of the method, apparatus, and non-transitory computer-readable medium described above may further include processes, features, means, or instructions for selecting a plurality of soft channel bits for at least one of the one or more downlink transmissions to skip storing in a soft channel bit buffer based at least in part on the identifying. Some examples of the method, apparatus, and non-transitory computer-readable medium described above may further include processes, features, means, or instructions for combining one or more soft channel bits from respective ones of the decoded one or more downlink transmissions.

In some examples of the method, apparatus, and non-transitory computer-readable medium described above, determining the soft channel bit buffer size may further comprise scaling the maximum soft channel bit buffer size associated with the TTI by a scaling factor corresponding to an index of an sTTI for a first one of the one or more downlink transmissions. Some examples of the method, apparatus, and non-transitory computer-readable medium described above may further include processes, features, means, or instructions for decoding the one or more downlink transmissions according to the determined transport block size and the scaled soft channel bit buffer size.

Some examples of the method, apparatus, and non-transitory computer-readable medium described above may further include processes, features, means, or instructions for receiving a retransmission of one or more of the received one or more downlink transmissions in the one or more sTTIs, the retransmission being in one or more retransmission TTIs and scaling the maximum soft channel bit buffer size associated with the retransmission TTI based on the one or more downlink transmissions being originally transmitted in the one or more sTTIs. In some examples of the method, apparatus, and non-transitory computer-readable medium described above, the retransmission and the received one or more downlink transmissions overlap. Some examples of the method, apparatus, and non-transitory computer-readable medium described above may further include processes, features, means, or instructions for decoding the retransmission according to the determined transport block size and the scaled soft channel bit buffer size. In some examples of the method, apparatus, and non-transitory computer-readable medium described above, a decoding technique used to decode the one or more downlink transmissions is different than a decoding technique used to decode the retransmission.

Some examples of the method, apparatus, and non-transitory computer-readable medium described above may further include processes, features, means, or instructions for determining a second scaling factor to scale the maximum soft channel bit buffer size associated with the retransmission TTI, wherein scaling the maximum soft channel bit buffer size associated with the retransmission TTI is scaled by the second scaling factor. In some examples of the method, apparatus, and non-transitory computer-readable medium described above, the second scaling factor is different than the first scaling factor.

A method of wireless communication is described. The method may include receiving one or more downlink transmissions corresponding to a transport block in one or more TTIs, wherein at least two of the one or more TTIs correspond to different TTI types, determining a first soft channel bit buffer size associated with the transport block for a first decoding operation of one or more decoding operations associated with each transmission of the one or more downlink transmissions, and decoding the one or more downlink transmissions according to the first soft channel bit buffer size.

An apparatus for wireless communication is described. The apparatus may include means for receiving one or more downlink transmissions corresponding to a transport block in one or more TTIs, wherein at least two of the one or more TTIs correspond to different TTI types, means for determining a first soft channel bit buffer size associated with the transport block for a first decoding operation of one or more decoding operations associated with each transmission of the one or more downlink transmissions, and means for decoding the one or more downlink transmissions according to the first soft channel bit buffer size.

Another apparatus for wireless communication is described. The apparatus may include a processor, memory in electronic communication with the processor, and instructions stored in the memory. The instructions may be operable to cause the processor to receive one or more downlink transmissions corresponding to a transport block in one or more TTIs, wherein at least two of the one or more TTIs correspond to different TTI types, determine a first soft channel bit buffer size associated with the transport block for a first decoding operation of one or more decoding operations associated with each transmission of the one or more downlink transmissions, and decode the one or more downlink transmissions according to the first soft channel bit buffer size.

A non-transitory computer-readable medium for wireless communication is described. The non-transitory computer-readable medium may include instructions operable to cause a processor to receive one or more downlink transmissions corresponding to a transport block in one or more TTIs, wherein at least two of the one or more TTIs correspond to different TTI types, determine a first soft channel bit buffer size associated with the transport block for a first decoding operation of one or more decoding operations associated with each transmission of the one or more downlink transmissions, and decode the one or more downlink transmissions according to the first soft channel bit buffer size.

Some examples of the method, apparatus, and non-transitory computer-readable medium described above may further include processes, features, means, or instructions for identifying that a second decoding operation of the one or more decoding operations may be associated with a second transmission in a shorter TTI than a first transmission associated with the first decoding operation. Some examples of the method, apparatus, and non-transitory computer-readable medium described above may further include processes, features, means, or instructions for selecting a plurality of soft channel bits for at least one of the one or more downlink transmissions to skip storing in a soft channel bit buffer based at least in part on the identifying. Some examples of the method, apparatus, and non-transitory computer-readable medium described above may further include processes, features, means, or instructions for combining one or more soft channel bits from respective ones of the decoded one or more downlink transmissions.

In some examples of the method, apparatus, and non-transitory computer-readable medium described above, the different TTI types comprise a one subframe TTI, a one slot sTTI, a two or three symbol sTTI, or any combination thereof.

A method of wireless communication is described. The method may include receiving one or more downlink transmissions corresponding to a transport block in one or more TTIs, wherein at least two of the one or more TTIs correspond to different TTI types, determining a soft channel bit buffer size associated with the transport block for each decoding operation of one or more decoding operations associated with the one or more downlink transmissions, aggregating the soft channel bit buffer size for each decoding operation to obtain an inter-TTI soft channel bit buffer size, and decoding the one or more downlink transmissions according to the inter-TTI soft channel bit buffer size.

An apparatus for wireless communication is described. The apparatus may include means for receiving one or more downlink transmissions corresponding to a transport block in one or more TTIs, wherein at least two of the one or more TTIs correspond to different TTI types, means for determining a soft channel bit buffer size associated with the transport block for each decoding operation of one or more decoding operations associated with the one or more downlink transmissions, means for aggregating the soft channel bit buffer size for each decoding operation to obtain an inter-TTI soft channel bit buffer size, and means for decoding the one or more downlink transmissions according to the inter-TTI soft channel bit buffer size.

Another apparatus for wireless communication is described. The apparatus may include a processor, memory in electronic communication with the processor, and instructions stored in the memory. The instructions may be operable to cause the processor to receive one or more downlink transmissions corresponding to a transport block in one or more TTIs, wherein at least two of the one or more TTIs correspond to different TTI types, determine a soft channel bit buffer size associated with the transport block for each decoding operation of one or more decoding operations associated with the one or more downlink transmissions, aggregate the soft channel bit buffer size for each decoding operation to obtain an inter-TTI soft channel bit buffer size, and decode the one or more downlink transmissions according to the inter-TTI soft channel bit buffer size.

A non-transitory computer-readable medium for wireless communication is described. The non-transitory computer-readable medium may include instructions operable to cause a processor to receive one or more downlink transmissions corresponding to a transport block in one or more TTIs, wherein at least two of the one or more TTIs correspond to different TTI types, determine a soft channel bit buffer size associated with the transport block for each decoding operation of one or more decoding operations associated with the one or more downlink transmissions, aggregate the soft channel bit buffer size for each decoding operation to obtain an inter-TTI soft channel bit buffer size, and decode the one or more downlink transmissions according to the inter-TTI soft channel bit buffer size.

Some examples of the method, apparatus, and non-transitory computer-readable medium described above may further include processes, features, means, or instructions for decoding, for each decoding operation of one or more decoding operations, the one or more downlink transmissions according to an intra-TTI soft channel bit buffer size associated with a current decoding operation.

Some examples of the method, apparatus, and non-transitory computer-readable medium described above may further include processes, features, means, or instructions for identifying that a second decoding operation of the one or more decoding operations may be associated with a second transmission in a shorter TTI than a first transmission associated with the first decoding operation. Some examples of the method, apparatus, and non-transitory computer-readable medium described above may further include processes, features, means, or instructions for selecting a plurality of soft channel bits for at least one of the one or more downlink transmissions to skip storing in a soft channel bit buffer based at least in part on the identifying. Some examples of the method, apparatus, and non-transitory computer-readable medium described above may further include processes, features, means, or instructions for combining one or more soft channel bits from respective ones of the decoded one or more downlink transmissions.

In some examples of the method, apparatus, and non-transitory computer-readable medium described above, the different TTI types comprise a one subframe TTI, a one slot sTTI, a two or three symbol sTTI, or any combination thereof.

A method of wireless communication is described. The method may include determining, in a TTI, an sTTI for transmission, the sTTI corresponding to one of a plurality of sTTI position indexes within the TTI, and selecting a CQI-to-MCS mapping based at least in part on the determined sTTI for transmission. The method may further include transmitting a downlink grant for a downlink transmission in the sTTI, the downlink grant comprising a resource block allocation for the downlink transmission and an MCS indicator determined based at least in part on the CQI-to-MCS mapping, and transmitting the downlink transmission over the sTTI.

An apparatus for wireless communication is described. The apparatus may include means for determining, in a TTI, an sTTI for transmission, the sTTI corresponding to one of a plurality of sTTI position indexes within the TTI, and means for selecting a CQI-to-MCS mapping based at least in part on the determined sTTI for transmission. The apparatus may further include means for transmitting a downlink grant for a downlink transmission in the sTTI, the downlink grant comprising a resource block allocation for the downlink transmission and an MCS indicator determined based at least in part on the CQI-to-MCS mapping, and means for transmitting the downlink transmission over the sTTI.

Another apparatus for wireless communication is described. The apparatus may include a processor, memory in electronic communication with the processor, and instructions stored in the memory. The instructions may be operable to cause the processor to determine, in a TTI, an sTTI for transmission, the sTTI corresponding to one of a plurality of sTTI position indexes within the TTI, and select a CQI-to-MCS mapping based at least in part on the determined sTTI for transmission. The instructions may be further operable to cause the processor to transmit a downlink grant for a downlink transmission in the sTTI, the downlink grant comprising a resource block allocation for the downlink transmission and an MCS indicator determined based at least in part on the CQI-to-MCS mapping, and transmit the downlink transmission over the sTTI.

A non-transitory computer-readable medium for wireless communication is described. The non-transitory computer-readable medium may include instructions operable to cause a processor to determine, in a TTI, an sTTI for transmission, the sTTI corresponding to one of a plurality of sTTI position indexes within the TTI, and select a CQI-to-MCS mapping based at least in part on the determined sTTI for transmission. The instructions may be further operable to cause the processor to transmit a downlink grant for a downlink transmission in the sTTI, the downlink grant comprising a resource block allocation for the downlink transmission and an MCS indicator determined based at least in part on the CQI-to-MCS mapping, and transmit the downlink transmission over the sTTI.

Some examples of the method, apparatus, and non-transitory computer-readable medium described above may further include processes, features, means, or instructions for determining a soft channel bit buffer size based at least in part on the determined sTTI for transmission. Some examples of the method, apparatus, and non-transitory computer-readable medium described above may further include processes, features, means, or instructions for performing rate matching according to the soft channel bit buffer size.

In some examples of the method, apparatus, and non-transitory computer-readable medium described above, the CQI-to-MCS mapping may be selected based at least in part on a CFI, a CRS overhead, a DMRS overhead, a broadcast signal overhead, a HARQ turnaround processing time, or any combination thereof.

DETAILED DESCRIPTION

Figure 1:
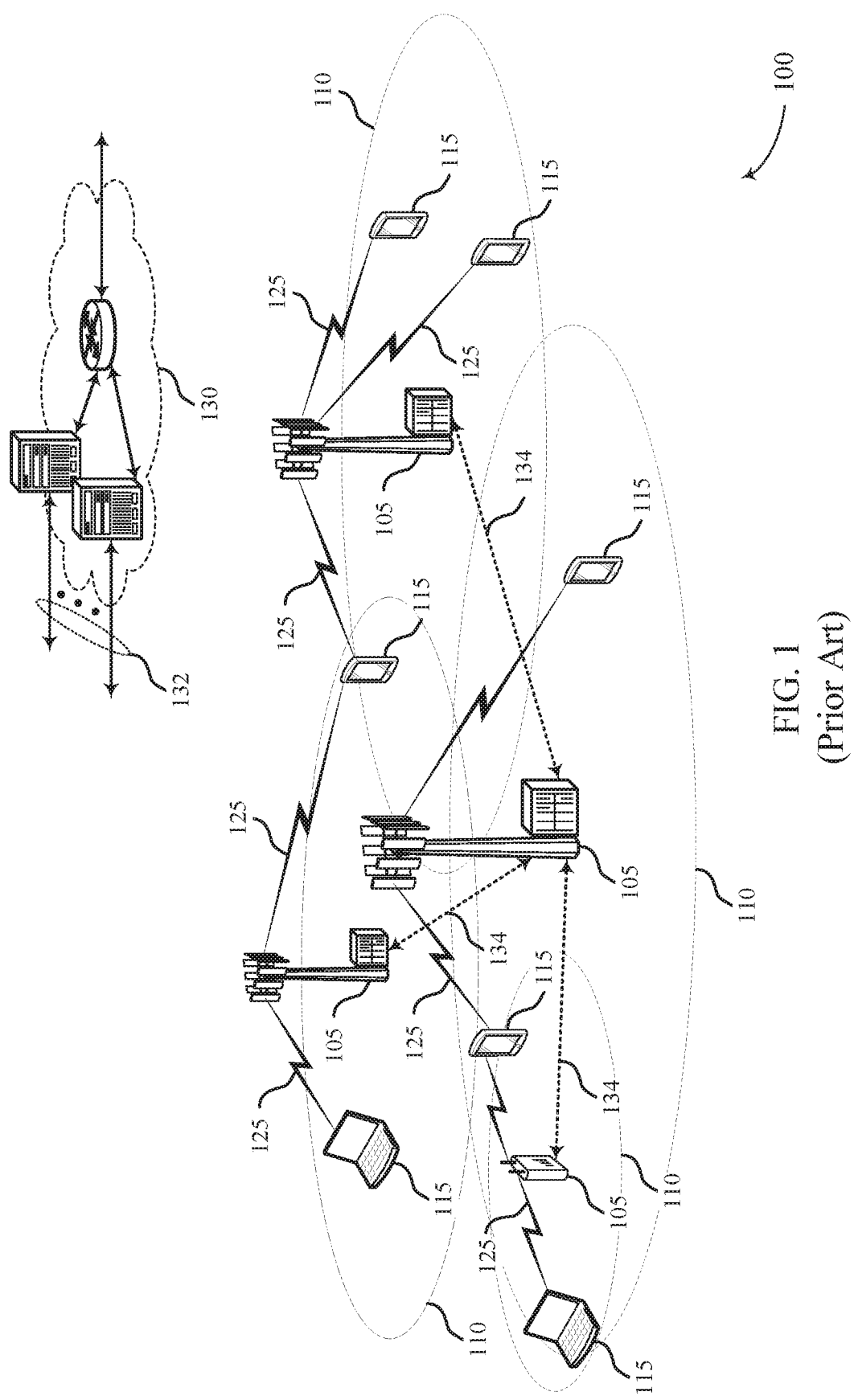
FIGS. 1 and 2 illustrate examples of systems for wireless communications that support determining transport block size, soft channel bit buffer size, and rate matching for short transmission time intervals (sTTIs) in accordance with aspects of the present disclosure.

In some wireless communications systems, a base station may transmit to a user equipment (UE) in different length transmission opportunities. For example, the base station may transmit a downlink grant and a downlink transmission in a physical downlink shared channel (PDSCH) within a 1 millisecond (ms) transmission time interval, which may be referred to as a "legacy" transmission time interval (TTI) or subframe. In other cases, the base station may transmit the downlink grant and downlink transmission in a short transmission time interval (sTTI), which may be shorter than a "legacy" TTI. For example, the sTTI may be an example of a 2 or 3 symbol (e.g., orthogonal frequency-division multiplexing (OFDM) symbol) sTTI, or a one slot sTTI (e.g., one half of a subframe).

The base station may indicate a resource block allocation and a modulation and coding scheme (MCS) value in the downlink grant. In some cases, the base station may select the MCS value based on adjusting a channel quality indicator (CQI)-to-MCS mapping for the downlink transmission on an sTTI-by-sTTI basis. The base station may have used these values (e.g., the resource block allocation and MCS) for encoding the downlink transmission, and, accordingly, the receiving UE may decode the downlink transmission using these values. For example, the UE receiving the downlink transmission may be configured to determine a transport block size, a soft channel bit buffer size, and rate matching used to encode the downlink transmission based on the resource block allocation and the MCS value. To additionally handle the different lengths of TTIs that the base station may use for the downlink transmission, the UE may further determine the transport block size, soft channel bit buffer size, and rate matching based on a length, index, or type of TTI used for transmission. For example, the UE may select the transport block size based on a scaling factor associated with a signaling overhead, a scaling factor associated with the type, length, or index of the sTTI for downlink transmission, or an sTTI type-specific transport block size table. Similarly, the UE may select the soft channel bit buffer size based on comparing a maximum soft channel bit buffer size value, N_IR, to a virtual buffer size corresponding to the transport block size (e.g., in some cases, three times the transport block size). In some cases, the value of N_IR may be based on a "legacy" one subframe TTI, and the UE may or may not scale the "legacy" N_IR value based on the type, length, or index of the sTTI. In some cases, the UE may handle receiving retransmissions of a downlink transmission in different length TTIs. For example, the UE may either use a soft channel bit buffer size associated with the first downlink transmission received, or may perform a matching or aggregation process based on multiple buffer sizes associated with retransmissions of the transport block in different length TTIs.

Aspects of the disclosure are initially described in the context of wireless communications systems. Additional aspects of the disclosure are described with respect to selection processes for determining soft channel bit buffer sizes and a process flow. Aspects of the disclosure are further illustrated by and described with reference to apparatus diagrams, system diagrams, and flowcharts that relate to transport block size, soft channel bit buffer size, and rate matching for sTTIs.

FIG. 1 illustrates an example of a wireless communications system 100 that supports determining transport block size, soft channel bit buffer size, and rate matching for sTTIs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, the wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. Control information (e.g., downlink control information (DCI)) may be transmitted in the physical control channel using a control channel format. Control information formats (e.g., DCI formats) may have different sizes (e.g., numbers of bits of control information), and a UE may perform blind decoding on a number of different formats to decode the information in the physical control channel. DCI formats may include formats for downlink and uplink grants, and formats may be associated with one or more codewords or transport blocks for each grant. For example, certain DCI formats may include separate fields (e.g., MCS, new data indicator, redundancy version) for two transport blocks. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems, a base station 105 may transmit one or more downlink transmissions in sTTIs. The sTTIs may be shorter than a "legacy" one subframe TTI. The base station 105 may additionally transmit a downlink grant indicating a resource block allocation and an MCS value for decoding the downlink transmission. The base station 105 and a UE 115 receiving the downlink transmission may be configured to determine a transport block size, soft channel bit buffer size, and rate matching based on the sTTI. For example, the base station 105 and UE 115 may select the transport block size based on a scaling factor associated with signaling overhead, a scaling factor associated with a type, length, or index of the sTTI for downlink transmission, or an sTTI type-specific transport block size table. Similarly, the base station 105 and UE 115 may select the soft channel bit buffer size based on comparing a soft channel bit buffer size value, N_IR, to a virtual buffer size corresponding to the transport block size. The value of N_IR may or may not be scaled based on the size of the sTTI. In some cases, the base station 105 and UE 115 may be configured to handle receiving retransmissions of a downlink transmission in different length TTIs (e.g., 2 symbol, 3 symbol, 1 slot, or 1 subframe TTIs).

Figure 2:
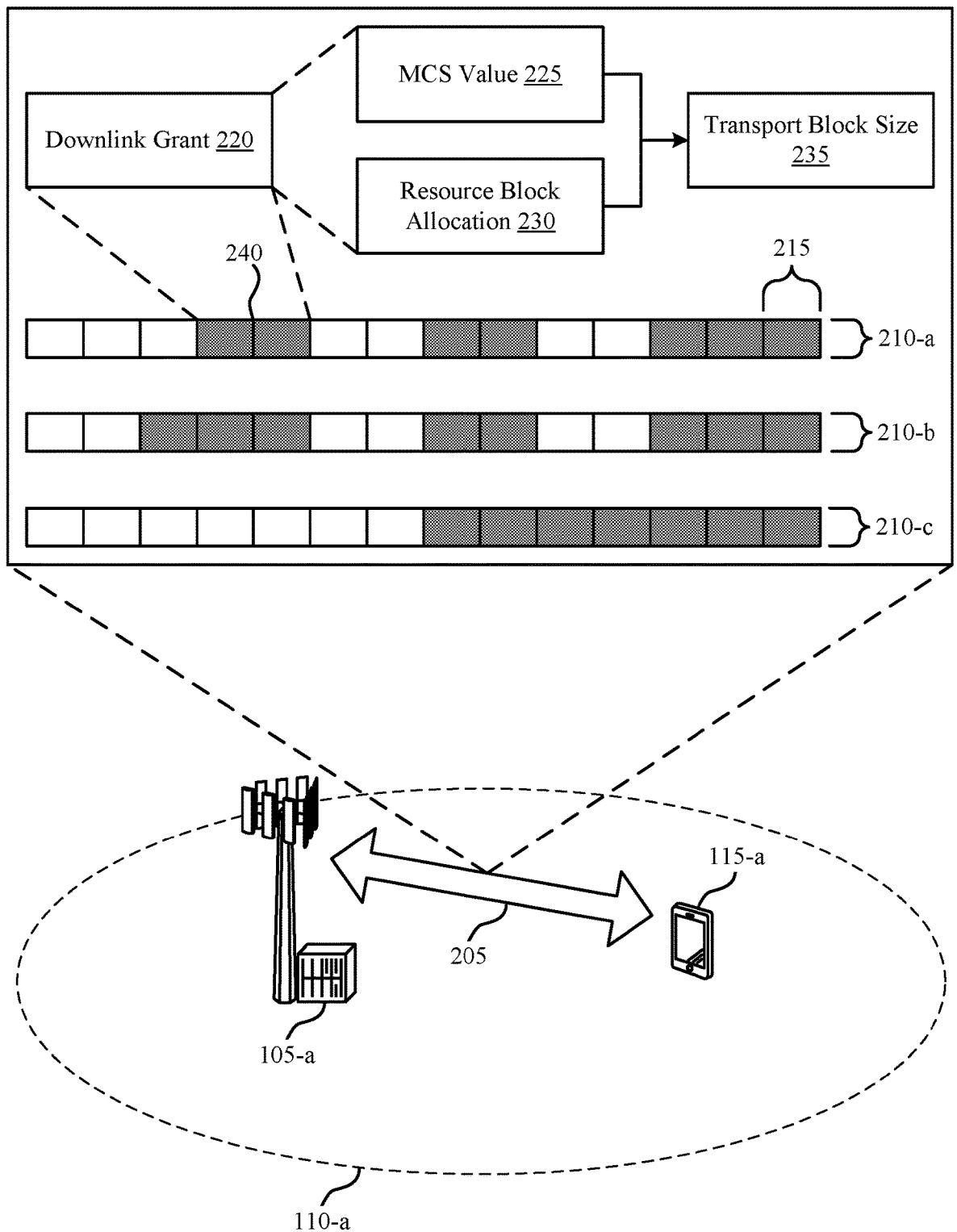

FIG. 2 illustrates an example of a wireless communications system 200 that supports determining transport block size, soft channel bit buffer size, and rate matching for sTTIs in accordance with aspects of the present disclosure. The wireless communications system 200 may include base station 105-a and UE 115-a, which may be examples of a base station 105 and a UE 115, as described with reference to FIG. 1. The base station 105-a may provide coverage for geographic coverage area 110-a, and base station 105-a and UE 115-a may communicate over communication link 205. For example, base station 105-a may transmit signals, including a downlink grant 220 and a downlink transmission, to UE 115-a over communication link 205 in a shortened PDSCH (sPDSCH) transmission. The base station 105-a and the UE 115-a may determine a transport block size, a soft channel bit buffer size, rate matching, or a combination of these parameters for encoding and decoding based on the sTTI length.

The base station 105-a may transmit on the downlink using one of a set of possible TTI types. These possible TTI types may include a TTI spanning one subframe, or 14 symbols 215, which may be examples of OFDM symbols. In some cases, this TTI may be referred to as a standard or a "legacy" TTI. Additionally, the set of possible TTI types may include sTTIs, which may be shorter in the time domain than the "legacy" TTI. One possible TTI type may be a 7 symbol 215 or one slot sTTI, and a second possible TTI type may be a 2 or 3 (2/3) symbol 215 sTTI. In FIG. 2, sTTI patterns 210-a and 210-b illustrate two possible formats for 2/3 symbol 215 sTTIs, and sTTI pattern 210-c illustrates a format for one slot sTTIs. For 2/3 sTTI patterns 210-a and 210-b, a subframe may contain six sTTIs, while for one slot sTTI pattern 210-c, a subframe may contain two sTTIs. The base station 105-a may transmit downlink traffic in a single sTTI to UE 115-a, which may result in the base station 105-a utilizing fewer resource elements (REs) when transmitting using shorter lengths of TTIs.

As illustrated, the base station 105-a may transmit a downlink grant 220 in an sTTI spanning two symbols (e.g., with symbol indexes 3 and 4, in sTTI pattern 210-a). However, in other cases, the base station 105-a may transmit the downlink grant 220 in any other sTTI of sTTI patterns 210. In addition to the downlink grant 220, the base station 105-a may transmit a downlink transmission 240, for example, in the same sTTI as the downlink grant 220. In some cases, the base station 105-a may transmit the downlink grant 220 in a first set of subcarriers, and may transmit the downlink transmission in a second set of subcarriers, where the first and second sets of subcarriers may or may not overlap. The downlink grant 220 may be within the first symbol 215 of the sTTI. The downlink grant 220 may indicate an MCS value 225 and a resource block allocation 230. The UE 115-a receiving the downlink grant 220 may determine a transport block size for the downlink transmission 240 based on the indicated MCS and number of physical resource blocks.

The base station 105-a and UE 115-a may be configured for determining the encoding rate for downlink transmissions in "legacy" TTIs. For example, the base station 105-a and UE 115-a may both include a transport block size table stored in memory. When UE 115-a receives a downlink grant 220, the UE 115-a may determine a transport block size index based on the indicated MCS value 225. If the UE 115-a received the downlink grant 220 and the downlink transmission in a one subframe "legacy" TTI, the UE 115-a may then lookup a transport block size in the table in memory based on the transport block size index and the number of allocated resource blocks. The UE 115-a may use this determined transport block size when decoding the received downlink transmission.

The configuration for handling downlink transmissions in sTTIs (e.g., over the sPDSCH) may be based on the configuration for handling downlink transmission in "legacy" TTIs. For example, the base station 105-a and UE 115-a may be configured such that a maximum aggregate transport block size for the sTTIs contained within a subframe is close to the maximum transport block size for the "legacy" TTI (e.g., with a length of one subframe). In such cases, for sTTI pattern 210-a, the sum of the transport block sizes for the first, second, third, fourth, fifth, and sixth sTTIs contained within a subframe may be within a certain size threshold of a transport block size for a one subframe TTI. This may allow a base station 105 utilizing an sTTI pattern 210 to transmit the same or a similar (e.g., within a certain threshold number of bits) amount of information in a downlink 1 ms subframe to the UE 115-a, which may optimize spectral efficiency.

The configuration for handling downlink transmissions in sTTIs may further include a maximum code rate threshold (e.g., 0.932). Additionally or alternatively, the transport block sizes for sTTIs may be determined based on a processing time threshold at the UE 115. For example, the UE 115-a may include a scheduled sTTI for HARQ transmission. The transport block sizes may be selected or determined based on allowing the UE 115-a time to process and determine whether or not decoding the downlink transmission was successful before the scheduled HARQ feedback transmission (e.g., where the transmission may be scheduled based on when the downlink grant 220 was received). In this way, UE processing capabilities may be constrained to be approximately the same as for processing transmissions received in "legacy" TTIs.

In a first aspect, the base station 105-a and UE 115-a may select transport block size 235 using a scaling factor that differs on an sTTI-by-sTTI basis. For example, the base station 105-a and UE 115-a may use a same transport block size table for sTTIs as used for "legacy" TTIs. However, the resource block allocation 230 may be scaled using a scaling factor associated with the sTTI for transmission or a signaling overhead within the downlink transmission. For example, the base station 105-a may determine the number of allocated resource blocks, and may determine a signaling overhead for the downlink transmission in the sTTI. The signaling overhead may include cell-specific reference signal (CRS) overhead, demodulation reference signal (DMRS) overhead, primary synchronization signal (PSS) overhead, secondary synchronization signal (SSS), physical broadcast channel (PBCH) signaling overhead, or any combination of these signal overheads. Base station 105-a may select a scaling factor (e.g., from a list of possible scaling factors stored in memory) based on the overhead, the type of TTI (e.g., 2/3 symbol 215 sTTI, one slot sTTI, or one subframe TTI), the sTTI index (e.g., in sTTI pattern 210-a, sTTI 4 and sTTI 5 may have different scaling factors, as sTTI 4 contains 2 symbols 215 and sTTI 5 contains 3 symbols 215), or some combination of these factors. Due to the variable overhead in an sTTI, base station 105-a may determine the scaling factor on a per sTTI basis and for each of one or more sTTI patterns 210. Exemplary overheads associated with CRS are presented below as one possible contributor to the scaling factor selection process:

| sTTI Length | sTTI Index | CRS Overhead |
|---|---|---|
| 2/3 symbol sTTI | sTTI 0 | Up to 1 CRS symbol per 2 symbols |
| | sTTI 1 (if CFI = 1 or 3) | 0 CRS symbols |
| | sTTI 2 | per 2 symbols |
| | sTTI 4 | Up to 2 CRS symbols per 2 symbols |
| | sTTI 3 | 1 CRS symbol per 3 symbols |
| | sTTI 5 | |
| | sTTI 1 (if CFI = 2) | |
| 1 slot sTTI | sTTI 0 | Up to 2 CRS symbols per 4-6 symbols depending on CFI |
| | sTTI 1 (normal subframe) | Up to 3 CRS symbols per 7 symbols |
| | sTTI 1 (TDD special subframe) | Depends on special subframe configuration |

In some cases, selecting the scaling factor may additionally be based on a processing capability of a UE 115. For example, the scaling factor may be based on an n+4 (e.g., UE 115-a may schedule to transmit HARQ in the case of an unsuccessful decoding process 4 symbols 215 after receiving the downlink grant 220) or n+6 HARQ turnaround processing time. In such cases, base station 105-a may implement a same scaling factor for a 2 symbol sTTI as a 3 symbol sTTI—in cases where the other parameters are the same—to meet such HARQ turnaround processing times.

The base station 105-a may scale the allocated number of physical resource blocks by the selected scaling factor (e.g., by multiplying the number of resource blocks by the scaling factor and, in some cases, rounding the resulting number to an integer value based on configured rounding rules). The base station 105-a may then lookup the associated transport block size 235 in the "legacy" transport block size table using the scaled number of resource blocks and the selected MCS value 225, and may encode the downlink transmission based on the determined transport block size 235. The base station 105-a may then indicate the resource block allocation 230 in the downlink grant 220 to UE 115-a. The UE 115-a may receive the resource block allocation 230 in the downlink grant 220, determine the scaling factor using a similar process as base station 105-a, and lookup the transport block size 235 in the transport block size table using the scaled number of resource blocks for a one subframe "legacy" TTI. The UE 115-a may decode the received downlink transmission using the determined transport block size 235.

In a second aspect, the base station 105-a and UE 115-a may select transport block size 235 based on an sTTI type-specific scaling factor. The scaling factor may be the same for each sTTI of a same length or type. For example, 2/3 symbol 215 sTTIs may correspond to standard scaling factor (e.g., ⅙ or 0.167) independent of sTTI index or overhead, while one slot sTTIs may correspond to a different standard scaling factor (e.g., ½ or 0.5) also independent of sTTI index or overhead. In this aspect, base station 105-a may maintain or adjust a CQI-to-MCS mapping on an sTTI-by-sTTI basis. For example, base station 105-a may receive CQI from the UE 115-a. For each sTTI, base station 105-a may determine a different mapping from the CQI to an MCS value for transmission, for example, based on the overhead in the sTTI, a length of the sTTI, an index of the sTTI, the type of transmission (e.g., a downlink sTTI or special sTTI), or some combination of these. This second aspect may provide power saving at the UE 115-a as compared to the first aspect, as the UE 115-a may not need to take into account the overhead or sTTI index when determining the scaling factor for scaling a received resource block allocation 230. As with the first aspect, the second aspect may be applicable to CRS-based sPDSCH and DMRS-based sPDSCH transmissions.

In a third aspect, the base station 105-a and UE 115-a may store one or more additional transport block size tables in memory corresponding to the other TTI types. For example, in addition to—or in place of—the one subframe TTI "legacy" table, the base station 105-a and UE 115-a may store one or more sTTI transport block size tables in memory. For example, the devices may store a 2/3 symbol 215 sTTI table in memory, a one slot sTTI table in memory, or both. In some cases, these additional tables may be based on tuning the one subframe TTI table according to the different lengths of sTTIs. These sTTI transport block size tables may be used to lookup transport block sizes 235 using the MCS value 225 and the resource block allocation 230 to achieve a certain code rate. In some cases, the base station 105-a, UE 115-a, or both may perform resource block allocation 230 scaling, CQI-to-MCS mapping adjustments, or MCS scaling in addition to these sTTI tables to take into account the signaling overhead difference between different sTTIs. For example, the stored sTTI transport block size tables may be based on tuning the "legacy" TTI table according to one sTTI index (e.g., an sTTI with a minimum signaling overhead), and the base station 105-a or UE 115-a may apply additional scaling for the other sTTI indexes.

Additionally or alternatively to modifying transport block size 235 selection based on the sTTI used for downlink transmission, the base station 105-a and UE 115-a may be configured to select a soft channel bit buffer size based on the sTTI. The soft channel bit buffer size selection may be based on a tradeoff between HARQ combining performance and complexity. For example, if the UE 115-a fails to successfully decode a transmission from the base station 105-a, the UE 115-a may transmit a HARQ message to the base station 105-a over communication link 205. The base station 105-a may then retransmit the downlink transmission to the UE 115-a, for example, with an additional downlink grant 220. The base station 105-a may retransmit the downlink transmission using a different encoding technique, or may retransmit the downlink transmission using different coded bits that, when combined with previously transmitted bits, may provide the UE 115-a with additional information for decoding the downlink transmission. The UE 115-a may receive these one or more additional downlink transmissions, and may determine soft channel bits (e.g., log-likelihood ratios (LLRs)) corresponding to the received transmissions. The UE 115-a may store or input these soft channel bits into a soft channel bit buffer, which may be used to decode the transmission (e.g., determining hard decisions on information bits based on the received soft channel bits). In the soft channel bit buffer, the UE 115-a may combine one or more soft channel bits from different retransmissions of the downlink transmission to improve the decoding performance. In some cases, this combining may be based on the size of the soft channel bit buffer.

Figure 3A:
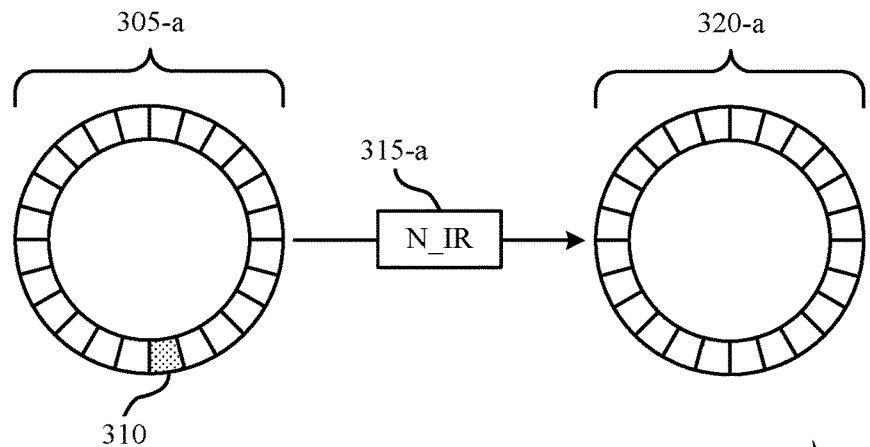
FIGS. 3A, 3B, and 3C illustrate examples of selection processes for determining soft channel bit buffer sizes for or encoding and decoding that support determining transport block size, soft channel bit buffer size, and rate matching for sTTIs in accordance with aspects of the present disclosure.
Figure 3B:
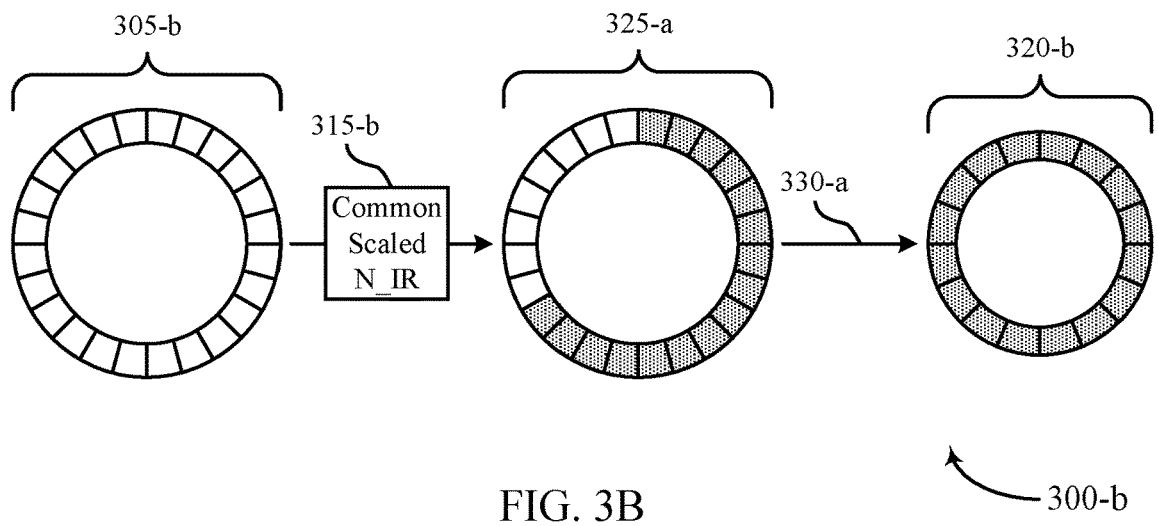
Figure 3C:
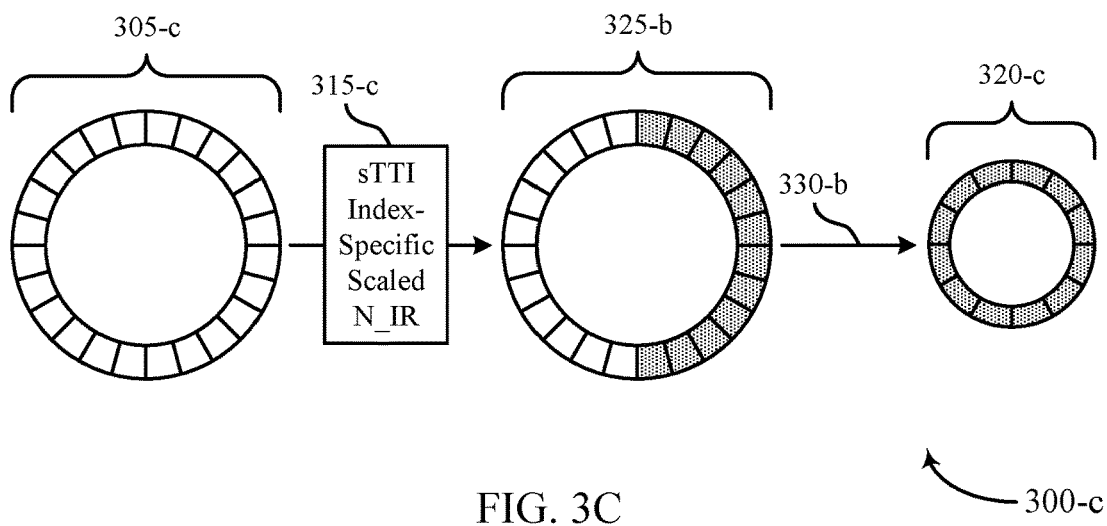

FIGS. 3A, 3B, and 3C illustrate examples of selection processes 300 for determining a soft channel bit buffer size for encoding or decoding. For example, FIG. 3A illustrates an example of a selection process 300-a for a soft channel bit buffer size that supports determining transport block size, soft channel bit buffer size, and rate matching for sTTIs in accordance with aspects of the present disclosure. Selection process 300-a may be performed by a base station 105 (e.g., in order to perform rate matching) or a UE 115 (e.g., to decode a downlink transmission), as described with respect to FIGS. 1 and 2. Selection process 300-a may include virtual soft channel bit buffer 305-a and physical soft channel bit buffer 320-a, which may be determined based on a number of incremental redundancy bits, N_IR. In the case of selection process 300-a, a base station 105 and UE 115 may use a same N_IR value for transmissions in "legacy" one subframe TTIs and transmission in 2/3 symbol or one slot sTTIs.

A wireless device, such as a base station 105 or UE 115, may determine a size for virtual soft channel bit buffer 305-a based on a determined transport block size (e.g., in some cases, determined using one of the aspects described above with respect to FIG. 2). For example, in some cases, virtual soft channel bit buffer 305-a may be set to three times the size of the transport block. As illustrated, virtual soft channel bit buffer 305-a may include 24 slots 310, where each slot may store soft channel bit information (e.g., an LLR, a soft decision on a bit, an aggregation of soft channel bits associated with retransmissions of a same downlink transmission, etc.). The illustrated example may correspond to a scenario with a hypothetical transport block size of 8, but the methods and processes described may be applicable to any size of transport block.

At 315-a, the wireless device may compare the value of N_IR to the size of the virtual soft channel bit buffer 305-a. The value of N_IR may represent a maximum size for the soft channel bit buffer implemented by the wireless device. In some cases, this maximum size may be based on a memory or processing capability of a UE 115 or a base station 105. The wireless device may select a size for a physical soft channel bit buffer 320-a corresponding to the smaller of the size of the virtual soft channel bit buffer 305-a and the number of incremental redundancy bits, N_IR. As illustrated, if the size of the virtual soft channel bit buffer 305-a is smaller than the value of N_IR, the physical soft channel bit buffer 320-a may be equivalent to the virtual soft channel bit buffer 305-a. When implementing a same N_IR value for sTTI transmissions as TTI transmissions, this may often be the case—although, in some cases, the size of virtual soft channel bit buffer 305-a may be greater than the value of N_IR, as described below with respect to FIGS. 3B and 3C.

A base station 105 may perform rate matching on the determined physical soft channel bit buffer 320-a. A UE 115 may perform HARQ combining based on the tradeoff between HARQ combining performance and complexity. For example, in some cases, the UE 115 may store the whole physical soft channel bit buffer 320-a at full precision for every sTTI. That is, the UE 115 may store the soft channel bits for downlink transmissions in sTTIs at a same precision that the UE 115 uses for storing soft channel bits for downlink transmissions in a "legacy" one subframe TTI. In other cases, the UE 115 may store the whole physical soft channel bit buffer 320-a at a reduced precision (i.e., as compared to storing soft channel bits for a "legacy" one subframe TTI). In yet other cases, the UE 115 may store a portion of the physical soft channel bit buffer 320-a, rather than the whole physical soft channel bit buffer 320-a. For example, the UE 115 may prioritize storing systematic bits and may drop or skip storing other soft channel bits. The UE 115 may select the portion of the physical soft channel bit buffer 320-a to store such that an aggregated HARQ memory footprint for retransmissions of a downlink transmission is no worse than the footprint for storing soft channel bits for a "legacy" TTI.

It should be understood that a base station 105 and a UE 115 may implement a number of incremental redundancy bits, N_IR, or a rate matching circular buffer size, N_cb. These terms may be used interchangeably throughout the disclosure, although N_IR and N_cb may have different values. For example, N_cb may be associated with an sPDSCH transmission per codeblock. As described in FIGS. 3A, 3B, and 3C, a wireless device may use either N_IR or N_cb to determine the size of the physical soft channel bit buffer 305-a.

FIG. 3B illustrates an example of a selection process 300-b for a soft channel bit buffer size that supports determining transport block size, soft channel bit buffer size, and rate matching for sTTIs in accordance with aspects of the present disclosure. Selection process 300-b may be performed by a base station 105 (e.g., in order to perform rate matching) or a UE 115 (e.g., to decode a downlink transmission), as described with respect to FIGS. 1 and 2. Selection process 300-b may include virtual soft channel bit buffer 305-b and physical soft channel bit buffer 320-b, which may be determined based on a value for N_IR (or, as described above, N_cb). In the case of selection process 300-b, a base station 105 and UE 115 may scale the value of N_IR by an sTTI type-specific scaling factor.

For example, a wireless device, such as a base station 105 or UE 115, may determine a size of virtual soft channel bit buffer 305-b based on a transport block size. At 315-b, the wireless device may compare the size of virtual soft channel bit buffer 305-b to a value of N_IR scaled by a common factor. For example, the wireless devices may select a common scaling factor based on the type of TTI for the downlink transmission. The value of N_IR may be associated with a "legacy" one subframe TTI (e.g., the one subframe TTI may be associated with a common scaling factor of 1). The wireless device may additionally store common scaling factors in memory for a 2/3 symbol sTTI (e.g., a scaling factor of ⅙) or a one slot sTTI (e.g., a scaling factor of ½). The wireless device may determine the TTI or sTTI type for transmission or reception, and may apply the scaling factor to the value of N_IR. The wireless device may then compare this common scaled N_IR to the virtual soft channel bit buffer 305-b size, and may set the size of physical soft channel bit buffer 320-b to the smaller of these two options. For example, as illustrated at 325-a, the size of virtual soft channel bit buffer 305-b may be 24 bits, while the common scaled N_IR value may be 16 bits. In such an example, the wireless device may reduce the size of the circular virtual soft channel bit buffer 305-b at 330-a to a circular physical soft channel bit buffer 320-b of size 16 (e.g., equal to the common scaled N_IR corresponding to that TTI type). In other cases, if the size of virtual soft channel bit buffer 305-b is smaller than the common scaled N_IR value, the size of physical soft channel bit buffer 320-b may be equivalent to the size of virtual soft channel bit buffer 305-b.

FIG. 3C illustrates an example of a selection process 300-c for a soft channel bit buffer size that supports determining transport block size, soft channel bit buffer size, and rate matching for sTTIs in accordance with aspects of the present disclosure. Selection process 300-c may be performed by a base station 105 (e.g., in order to perform rate matching) or a UE 115 (e.g., to decode a downlink transmission), as described with respect to FIGS. 1 and 2. Selection process 300-c may include virtual soft channel bit buffer 305-c and physical soft channel bit buffer 320-c, which may be determined based on a value for N_IR (or, as described above, N_cb). In the case of selection process 300-c, a base station 105 and UE 115 may scale the value of N_IR by a scaling factor determined on an sTTI-by-sTTI basis. These scaling factors may be based on a maximum transport block size for each sTTI, which may allow for an effective code rate after HARQ combining comparable (e.g., within a certain threshold code rate) to a code rate for a "legacy" one subframe TTI.

For example, a wireless device, such as a base station 105 or UE 115, may determine a size of virtual soft channel bit buffer 305-c based on a transport block size. At 315-c, the wireless device may compare the size of virtual soft channel bit buffer 305-c to a value of N_IR scaled by an sTTI index-specific scaling factor. For example, the wireless devices may select a common scaling factor based on a length of the sTTI or an index of the sTTI for the downlink transmission. The value of N_IR may be associated with a "legacy" one subframe TTI (e.g., the one subframe TTI may be associated with a common scaling factor of 1). The wireless device may additionally store scaling factors in memory for 2 symbol sTTIs, 3 symbol sTTIs, one slot sTTIs, or any index of sTTI. The wireless device may determine sTTI length or index for transmission or reception, and may apply the scaling factor to the value of N_IR. The wireless device may then compare this sTTI index-specific scaled N_IR to the size of virtual soft channel bit buffer 305-c, and may set the size of physical soft channel bit buffer 320-c to the smaller of these two options. For example, as illustrated at 325-b, the size of virtual soft channel bit buffer 305-c may be 24 bits, while the sTTI index-specific scaled N_IR value may be 12 bits. In such an example, the wireless device may reduce the size of the circular virtual soft channel bit buffer 305-c at 330-b to a circular physical soft channel bit buffer 320-c of size 12 (e.g., equal to the sTTI index-specific scaled N_IR). In other cases, if the virtual soft channel bit buffer 305-c size is smaller than the sTTI index-specific scaled N_IR value, the physical soft channel bit buffer 320-c may be equivalent to the virtual soft channel bit buffer 305-c.

For N_IR or N_cb scaling, as discussed in FIGS. 3B and 3C, a wireless device may be configured for handling downlink retransmissions in different TTI types. For example, if a UE 115 fails to decode a transport block received in a first TTI of a first TTI length and transmits a negative acknowledgement (NACK) HARQ message to a base station 105, the base station 105 may transmit a retransmission of the downlink transmission in a second TTI having a different TTI length. In some cases, these different lengths of TTIs may result in a first transmission in a "legacy" one subframe TTI with a size of physical soft channel bit buffer 320 equal to N_IR and a second transmission in a 2 symbol sTTI with a size of physical soft channel bit buffer 320 equal to N_IR/6. In other cases, these different lengths of TTIs may result in a first transmission in a 2 symbol sTTI with a size of physical soft channel bit buffer 320 equal to N_IR/6 and a second transmission in a one slot sTTI with a size of physical soft channel bit buffer 320 equal to N_IR/2. It should be understood that other differences in transmission TTI lengths may be possible, including scenarios where multiple retransmissions are transmitted in more than two different TTI lengths.

In such cases, base stations 105 and UEs 115 may be configured with a same process for determining the circular buffer sizing. In a first aspect, a base station 105 and a UE 115 may determine the size of physical soft channel bit buffer 320 based on the first transmission of the transport block. The wireless devices may then store indications of the buffer sizes for each HARQ retransmissions of the downlink transmission, but may perform encoding (e.g., rate matching) and decoding based on the determined size of physical soft channel bit buffer 320 for the first transmission. The sizes of the physical circular buffer may be determined independently for each transport block. For example, where a transmission for a HARQ process includes multiple transport blocks (e.g., one transport block that is being retransmitted and one new transport block), the sizes of the physical circular buffers may be determined independently (e.g., based on the first transmission for each transport block). In some cases, the UE 115 may drop or skip storing a portion of the soft channel bits in the physical soft channel bit buffer 320 based on the change in TTI length (e.g., from a longer TTI to a shorter TTI). For example, UE 115 may drop the soft channel bits in order to keep the aggregate buffer size (e.g., over all HARQ processes) under a "legacy" TTI soft channel bit maximum.

In a second aspect, the base station 105 and UE 115 may determine the size of physical soft channel bit buffer 320 for each transmission of the transport block. For example, the wireless devices may determine different sizes of physical soft channel bit buffer 320 based on scaling the N_IR value for transmissions in different length TTIs. A UE 115 may then store indications of the buffer sizes and the received signals for each HARQ retransmission of the downlink transmission. The UE 115 may then perform decoding using intra-TTI HARQ combining (e.g., combining soft channel bits in a soft channel bit buffer 320 of a size corresponding to the most recently received retransmission), inter-TTI HARQ combining (e.g., by matching or aggregating differently sized soft channel bit buffers 320 to determine a size for a combined physical soft channel bit buffer 320, and combining soft channel bits in the combined physical soft channel bit buffer 320), or both. In some cases, the UE 115 may drop or skip storing a portion of the soft channel bits in the physical soft channel bit buffer 320 or combined physical soft channel bit buffer 320 based on the change in TTI length (e.g., from a longer TTI to a shorter TTI). For example, UE 115 may drop the soft channel bits in order to keep the aggregate buffer size under a "legacy" TTI soft channel bit maximum.

Figure 4:
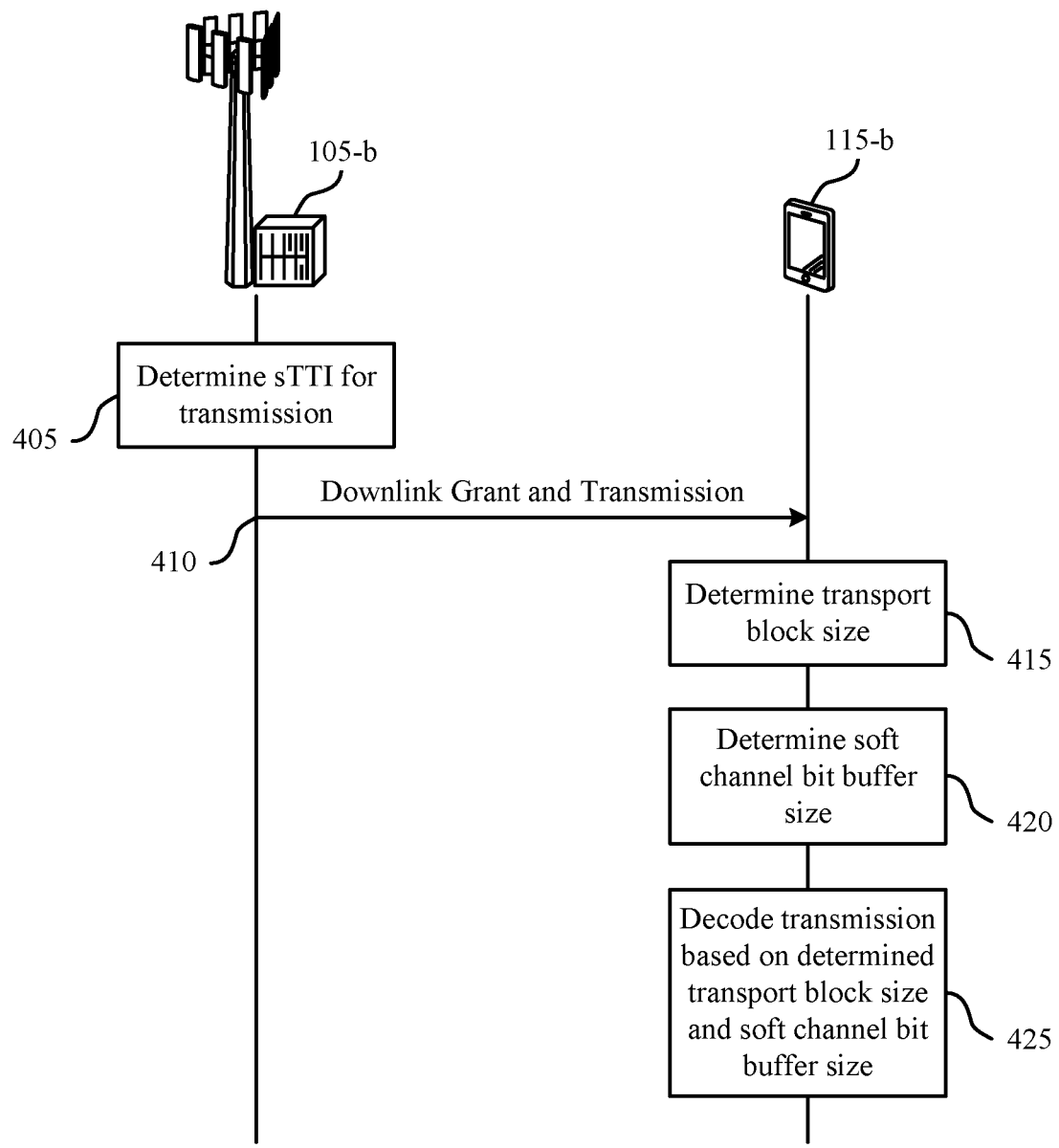
FIG. 4 illustrates an example of a process flow that supports determining transport block size, soft channel bit buffer size, and rate matching for sTTIs in accordance with aspects of the present disclosure.

FIG. 4 illustrates an example of a process flow 400 that supports determining transport block size, soft channel bit buffer size, and rate matching for sTTIs in accordance with aspects of the present disclosure. The process flow 400 includes base station 105-b and UE 115-b, which may be examples of a base station 105 and a UE 115 as described with reference to FIGS. 1 and 2. Base station 105-b and UE 115-b may perform some or all of the functions described below with respect to determining transport block sizes, soft channel bit buffer sizes, and rate matching for downlink transmissions in an sTTI.

At 405, the base station 105-b may determine an sTTI for downlink transmission. The sTTI may be an example of a 2/3 symbol sTTI or a one slot sTTI, and may correspond to one or more sTTI indexes within a TTI or subframe. In some cases, the base station 105-b may additionally select a CQI-to-MCS mapping based on the sTTI for transmission and, in some cases, a CFI, a CRS overhead, a DMRS overhead, a broadcast signal (e.g., a PSS, SSS, or PBCH signal) overhead, a HARQ turnaround processing time, or some combination of these parameters.

At 410, the base station 105-b may transmit a downlink grant and a downlink transmission in the determined sTTI to UE 115-b. The downlink grant may include a resource block allocation for the downlink transmission, an MCS indicator (e.g., an MCS value or index) based on the CQI-to-MCS mapping, or both. Additionally, in some cases, the base station 105-b may determine a soft channel bit buffer size based on the determined sTTI, and may perform rate matching on the downlink transmission, and any retransmissions of the downlink transmission, based on the determined soft channel bit buffer size. The UE 115-b may receive the downlink grant and the downlink transmission in the sTTI.

At 415, the UE 115-b may determine a transport block size for the downlink transmission, for example, based on the downlink grant. In some cases, the UE 115-b may include a transport block size table associated with a TTI (e.g., a subframe-long downlink transmission) stored in memory. The UE 115-b may scale the resource block allocation signaled in the downlink grant by a scaling factor associated with the sTTI index that the downlink transmission was received within. The UE 115-b may then lookup the transport block size associated with this scaled resource block allocation in the transport block size table stored in memory. In other cases, the UE 115-b may store multiple transport block size tables in memory, each of which may be associated with a different length downlink transmission (e.g., a 2/3 symbol sTTI, a one slot sTTI, a one subframe TTI, etc.) or an sTTI index. The UE 115-b may identify the length or the index of the sTTI that the downlink transmission was received in, and may select which transport block size table to utilize based on the length of the sTTI, the index of the sTTI, or both. The UE 115-b may then lookup, in the selected table in memory, the transport block size associated with the resource block allocation in the downlink grant.

At 420, the UE 115-b may determine a soft channel bit buffer size for the transport block. For example, the UE 115-b may determine the soft channel bit buffer size based on the transport block size and a maximum soft channel bit buffer size associated a TTI, or associated with the sTTI in which the downlink transmission was received. In some cases, the UE 115-b may scale the maximum soft channel bit buffer size associated with a TTI by a scaling factor corresponding to an index of the sTTI or a length of the sTTI in which the downlink transmission was received. If the UE 115-b receives one or more retransmissions of a same downlink transmission, the UE 115-b may select a soft channel bit buffer size based on the sTTI in which the first of the downlink transmission was received, or based on an aggregation of multiple sTTIs in which the downlink transmissions are received.

At 425, the UE 115-b may decode the received downlink transmission based on the determined transport block size and soft channel bit buffer size. For example, the UE 115-b may determine the same transport block size and soft channel bit buffer size for decoding as base station 105-b used for encoding the downlink transmission. The UE 115-b may store soft channel bits in a soft channel bit buffer of the determined size, and may decode the downlink transmission using the stored bits, and, in some cases, any retransmissions of the downlink transmission. In some cases, the UE 115-b may drop some bits (e.g., select one or more soft channel bits to skip storing in the soft channel bit buffer) based on the length of an sTTI in which the bits were received.

Figure 5:
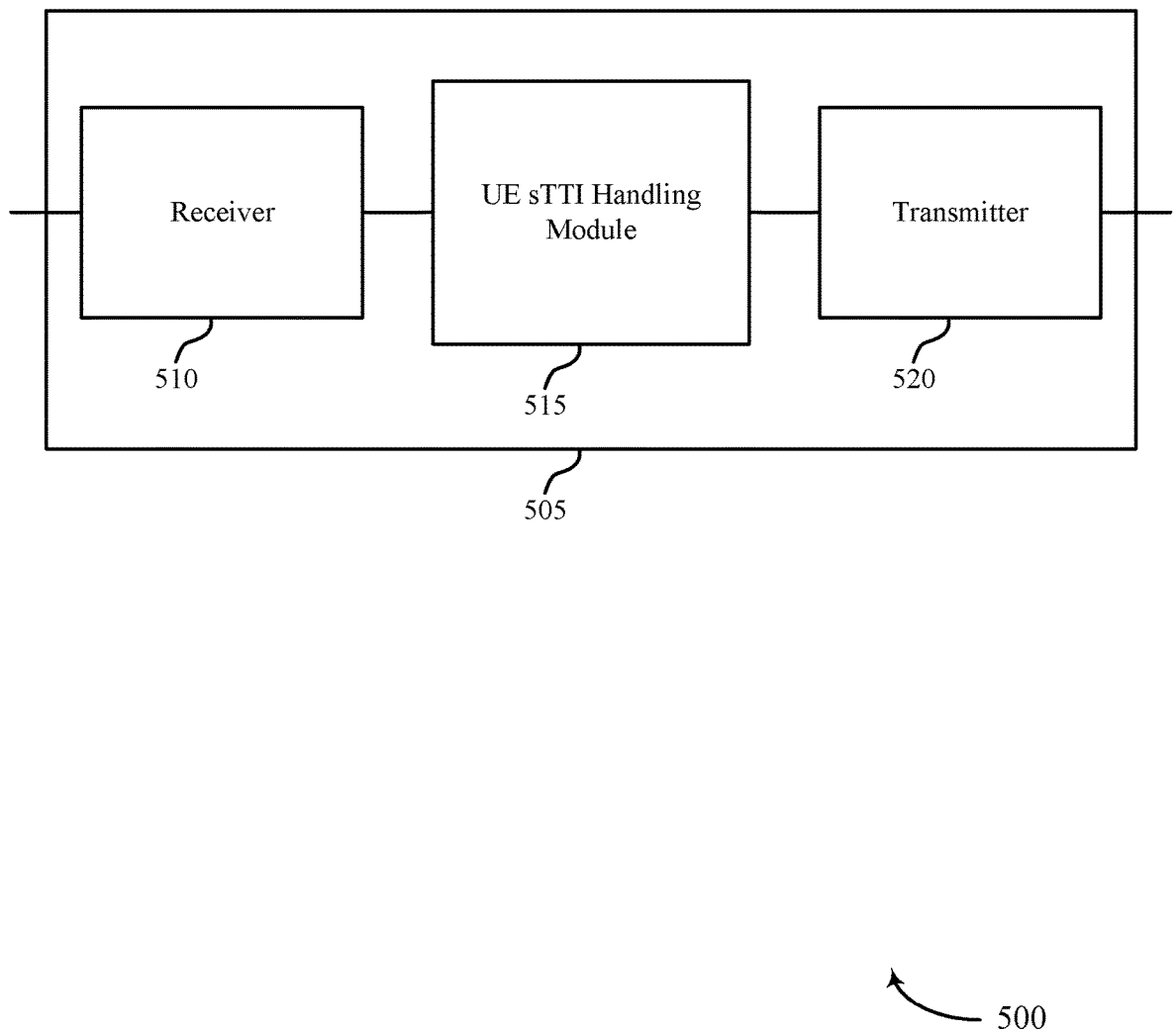
FIGS. 5 through 10 show block diagrams of wireless devices that support determining transport block size, soft channel bit buffer size, and rate matching for sTTIs in accordance with aspects of the present disclosure.

FIG. 5 shows a block diagram 500 of a wireless device 505 that supports determining transport block size, soft channel bit buffer size, and rate matching for sTTIs in accordance with aspects of the present disclosure. The wireless device 505 may be an example of aspects of a UE 115 as described herein. The wireless device 505 may include receiver 510, UE sTTI handling module 515, and transmitter 520. The wireless device 505 may also include a processor. Each of these components may be in communication with one another (e.g., via one or more buses).

The receiver 510 may receive information such as packets, user data, or control information associated with various information channels (e.g., control channels, data channels, and information related to transport block size, soft channel bit buffer size, and rate matching for sTTIs, etc.). Information may be passed on to other components of the device. The receiver 510 may be an example of aspects of the transceiver 1235 described with reference to FIG. 12. The receiver 510 may utilize a single antenna or a set of antennas.

The UE sTTI handling module 515 may be an example of aspects of the UE sTTI handling module 1215 described with reference to FIG. 12. The UE sTTI handling module 515 and/or at least some of its various sub-components may be implemented in hardware, software executed by a processor, firmware, or any combination thereof. If implemented in software executed by a processor, the functions of the UE sTTI handling module 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE sTTI handling module 515 and/or at least some of its various sub-components may be physically located at various positions, including being distributed such that portions of functions are implemented at different physical locations by one or more physical devices. In some examples, the UE sTTI handling module 515 and/or at least some of its various sub-components may be a separate and distinct component in accordance with aspects of the present disclosure. In other examples, the UE sTTI handling module 515 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

In a first aspect, the UE sTTI handling module 515 may receive a downlink grant for a downlink transmission in an sTTI, the sTTI corresponding to one of a set of sTTI position indexes within a TTI, and the downlink grant including a resource block allocation for the downlink transmission, and may receive the downlink transmission over the sTTI. The UE sTTI handling module 515 may additionally determine a transport block size for the downlink transmission based on scaling the resource block allocation by a scaling factor corresponding to an index of the sTTI within the set of sTTI position indexes, and applying the scaled resource block allocation to a transport block size table associated with the TTI, and may decode the downlink transmission according to the determined transport block size.

In a second aspect, the UE sTTI handling module 515 may receive a downlink grant for a downlink transmission in an sTTI, the sTTI corresponding to one of a set of sTTI position indexes within a TTI, and the downlink grant including a resource block allocation for the downlink transmission, receive the downlink transmission over the sTTI, determine a transport block size for the downlink transmission based on a transport block size table associated with the sTTI, and decode the downlink transmission according to the determined transport block size.

In a third aspect, the UE sTTI handling module 515 may receive one or more downlink transmissions in one or more sTTIs, each of the sTTIs corresponding to one of a set of sTTI position indexes within one or more TTIs. The UE sTTI handling module 515 may determine a transport block size for a transport block of the one or more downlink transmissions, determine a soft channel bit buffer size associated with the transport block based on the transport block size and a maximum soft channel bit buffer size associated with the TTI, and decode the one or more downlink transmissions according to the determined transport block size and soft channel bit buffer size.

In a fourth aspect, the UE sTTI handling module 515 may receive one or more downlink transmissions corresponding to a transport block in one or more TTIs, where at least two of the one or more TTIs correspond to different TTI types, determine a first soft channel bit buffer size associated with the transport block for a first decoding operation of one or more decoding operations associated with each transmission of the one or more downlink transmissions, and decode the one or more downlink transmissions according to the first soft channel bit buffer size.

In a fifth aspect, the UE sTTI handling module 515 may receive one or more downlink transmissions corresponding to a transport block in one or more TTIs, where at least two of the one or more TTIs correspond to different TTI types, and may determine a soft channel bit buffer size associated with the transport block for each decoding operation of one or more decoding operations associated with the one or more downlink transmissions. The UE sTTI handling module 515 may aggregate the soft channel bit buffer size for each decoding operation to obtain an inter-TTI soft channel bit buffer size, and may decode the one or more downlink transmissions according to the inter-TTI soft channel bit buffer size.

In a sixth aspect, the UE sTTI handling module 515 may receive one or more downlink transmissions in one or more sTTIs, each of the sTTIs corresponding to one of a plurality of sTTI position indexes within one or more TTIs, determine a transport block size for a transport block of the one or more downlink transmissions, and determine a soft channel bit buffer size associated with the transport block based on the transport block size and a maximum soft channel bit buffer size associated with the TTI. The UE sTTI handling module 515 may decode the one or more downlink transmissions according to the determined transport block size and soft channel bit buffer size and determine a level of precision at which to store, in a soft channel bit buffer, a plurality of soft channel bits associated with the one or more downlink transmissions.

In a seventh aspect, the UE sTTI handling module 515 may receive one or more downlink transmissions in one or more sTTIs, each of the sTTIs corresponding to one of a plurality of sTTI position indexes within one or more TTIs, determine a transport block size for a transport block of the one or more downlink transmissions, and determine a soft channel bit buffer size associated with the transport block based on the transport block size and a maximum soft channel bit buffer size associated with the TTI. The UE sTTI handling module 515 may scale the maximum soft channel bit buffer size associated with the TTI by a scaling factor corresponding to an index of an sTTI for a first one of the one or more downlink transmissions and soft channel bit buffer size and decode the one or more downlink transmissions according to the determined transport block size and the scaled soft channel bit buffer size.

The transmitter 520 may transmit signals generated by other components of the device. In some examples, the transmitter 520 may be collocated with a receiver 510 in a transceiver module. For example, the transmitter 520 may be an example of aspects of the transceiver 1235 described with reference to FIG. 12. The transmitter 520 may utilize a single antenna or a set of antennas.

Figure 6:
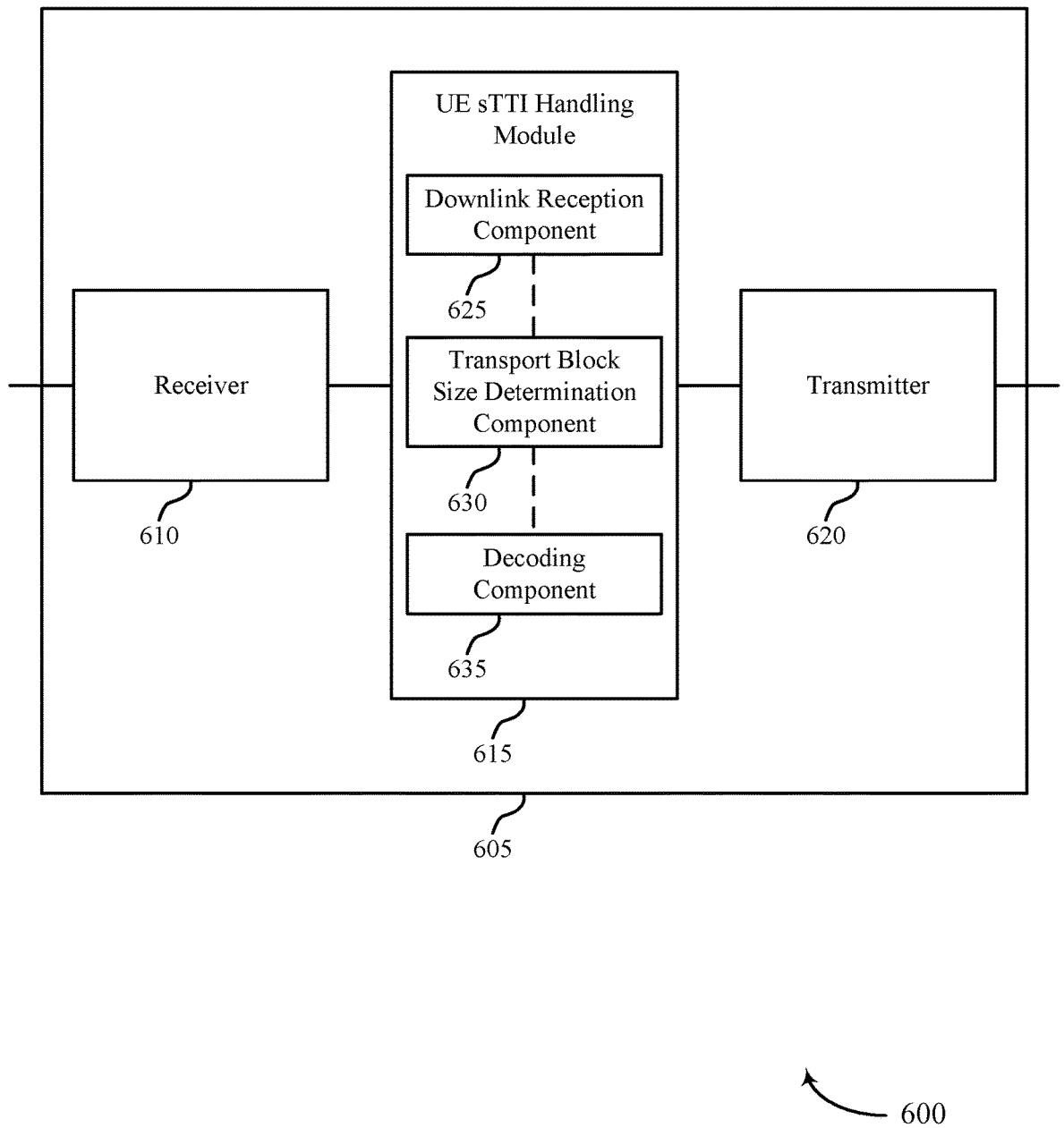

FIG. 6 shows a block diagram 600 of a wireless device 605 that supports determining transport block size, soft channel bit buffer size, and rate matching for sTTIs in accordance with aspects of the present disclosure. The wireless device 605 may be an example of aspects of a wireless device 505 or a UE 115 as described with reference to FIGS. 1, 2, and 5. The wireless device 605 may include receiver 610, UE sTTI handling module 615, and transmitter 620. The wireless device 605 may also include a processor. Each of these components may be in communication with one another (e.g., via one or more buses).

The receiver 610 may receive information such as packets, user data, or control information associated with various information channels (e.g., control channels, data channels, and information related to determining transport block size, soft channel bit buffer size, and rate matching for sTTIs, etc.). Information may be passed on to other components of the device. The receiver 610 may be an example of aspects of the transceiver 1235 described with reference to FIG. 12. The receiver 610 may utilize a single antenna or a set of antennas.

The UE sTTI handling module 615 may be an example of aspects of the UE sTTI handling module 1215 described with reference to FIG. 12. The UE sTTI handling module 615 may also include downlink reception component 625, transport block size determination component 630, and decoding component 635.

The downlink reception component 625 may receive a downlink grant for a downlink transmission in an sTTI, the sTTI corresponding to one of a set of sTTI position indexes within a TTI, the downlink grant including a resource block allocation for the downlink transmission and receive the downlink transmission over the sTTI.

The transport block size determination component 630 may determine a transport block size for the downlink transmission based on scaling the resource block allocation by a scaling factor corresponding to an index of the sTTI within the set of sTTI position indexes, and applying the scaled resource block allocation to a transport block size table associated with the TTI. In some cases, the scaling factor further corresponds to a CFI, a CRS overhead, a DMRS overhead, a broadcast signal overhead, a HARQ turnaround processing time, or any combination thereof.

The decoding component 635 may decode the downlink transmission according to the determined transport block size.

The transmitter 620 may transmit signals generated by other components of the device. In some examples, the transmitter 620 may be collocated with a receiver 610 in a transceiver module. For example, the transmitter 620 may be an example of aspects of the transceiver 1235 described with reference to FIG. 12. The transmitter 620 may utilize a single antenna or a set of antennas.

Figure 7:
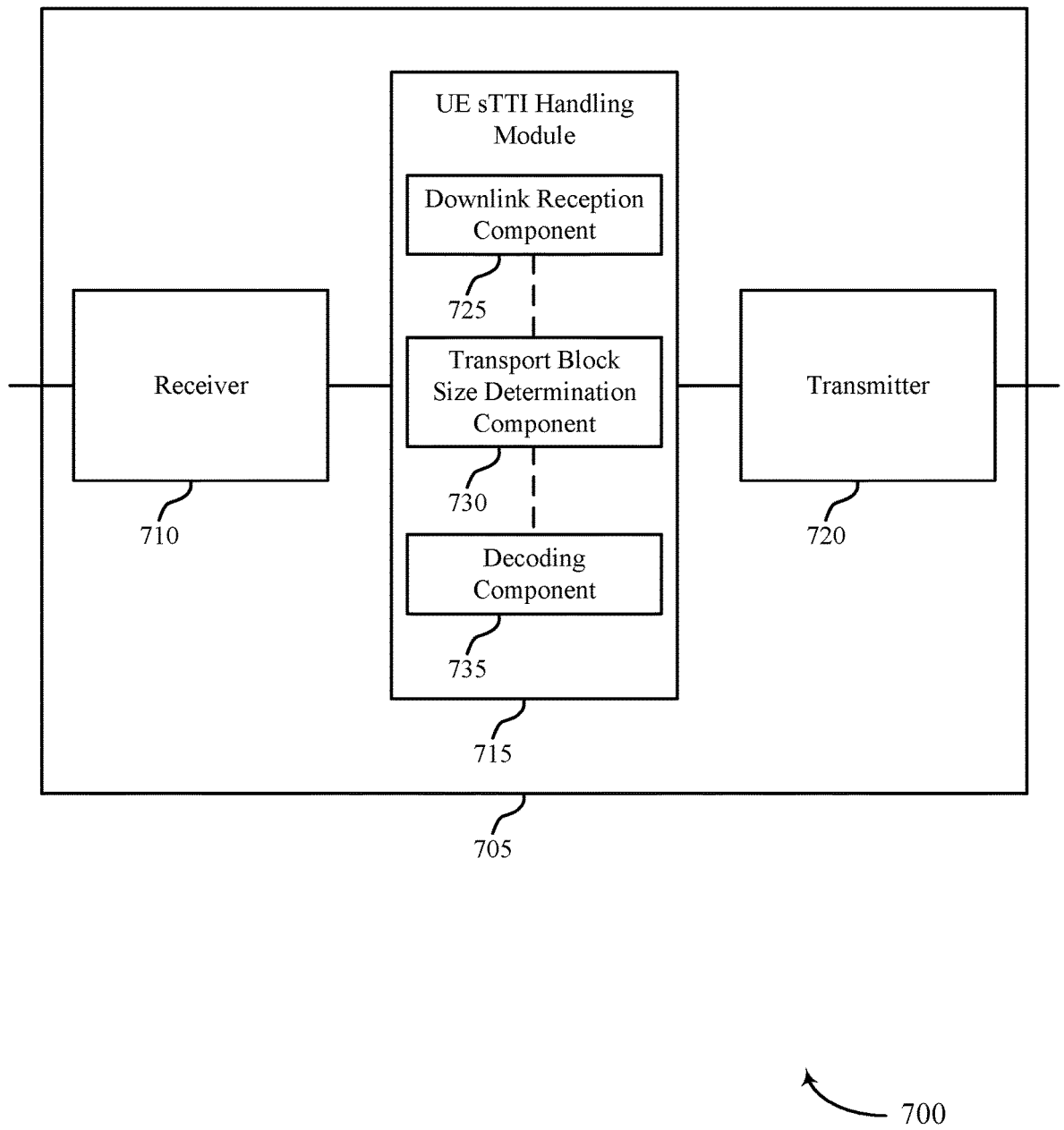

FIG. 7 shows a block diagram 700 of a wireless device 705 that supports determining transport block size, soft channel bit buffer size, and rate matching for sTTIs in accordance with aspects of the present disclosure. The wireless device 705 may be an example of aspects of a wireless device 505 or 605, or a UE 115 as described with reference to FIG. 1, 2, 5, or 6. The wireless device 705 may include a receiver 710, UE sTTI handling module 715, and transmitter 720. The wireless device 705 may also include a processor. Each of these components may be in communication with one another (e.g., via one or more buses).

The receiver 710 may receive information such as packets, user data, or control information associated with various information channels (e.g., control channels, data channels, and information related to determining transport block size, soft channel bit buffer size, and rate matching for sTTIs, etc.). Information may be passed on to other components of the device. The receiver 710 may be an example of aspects of the transceiver 1235 described with reference to FIG. 12. The receiver 710 may utilize a single antenna or a set of antennas.

The UE sTTI handling module 715 may be an example of aspects of the UE sTTI handling module 1215 described with reference to FIG. 12. The UE sTTI handling module 715 may also include a downlink reception component 725, transport block size determination component 730, and decoding component 735.

The downlink reception component 725 may receive a downlink grant for a downlink transmission in an sTTI, the sTTI corresponding to one of a set of sTTI position indexes within a TTI, the downlink grant including a resource block allocation for the downlink transmission and receive the downlink transmission over the sTTI.

The transport block size determination component 730 may determine a transport block size for the downlink transmission based on a transport block size table associated with the sTTI.

The decoding component 735 may decode the downlink transmission according to the determined transport block size.

The transmitter 720 may transmit signals generated by other components of the device. In some examples, the transmitter 720 may be collocated with a receiver 710 in a transceiver module. For example, the transmitter 720 may be an example of aspects of the transceiver 1235 described with reference to FIG. 12. The transmitter 720 may utilize a single antenna or a set of antennas.

Figure 8:
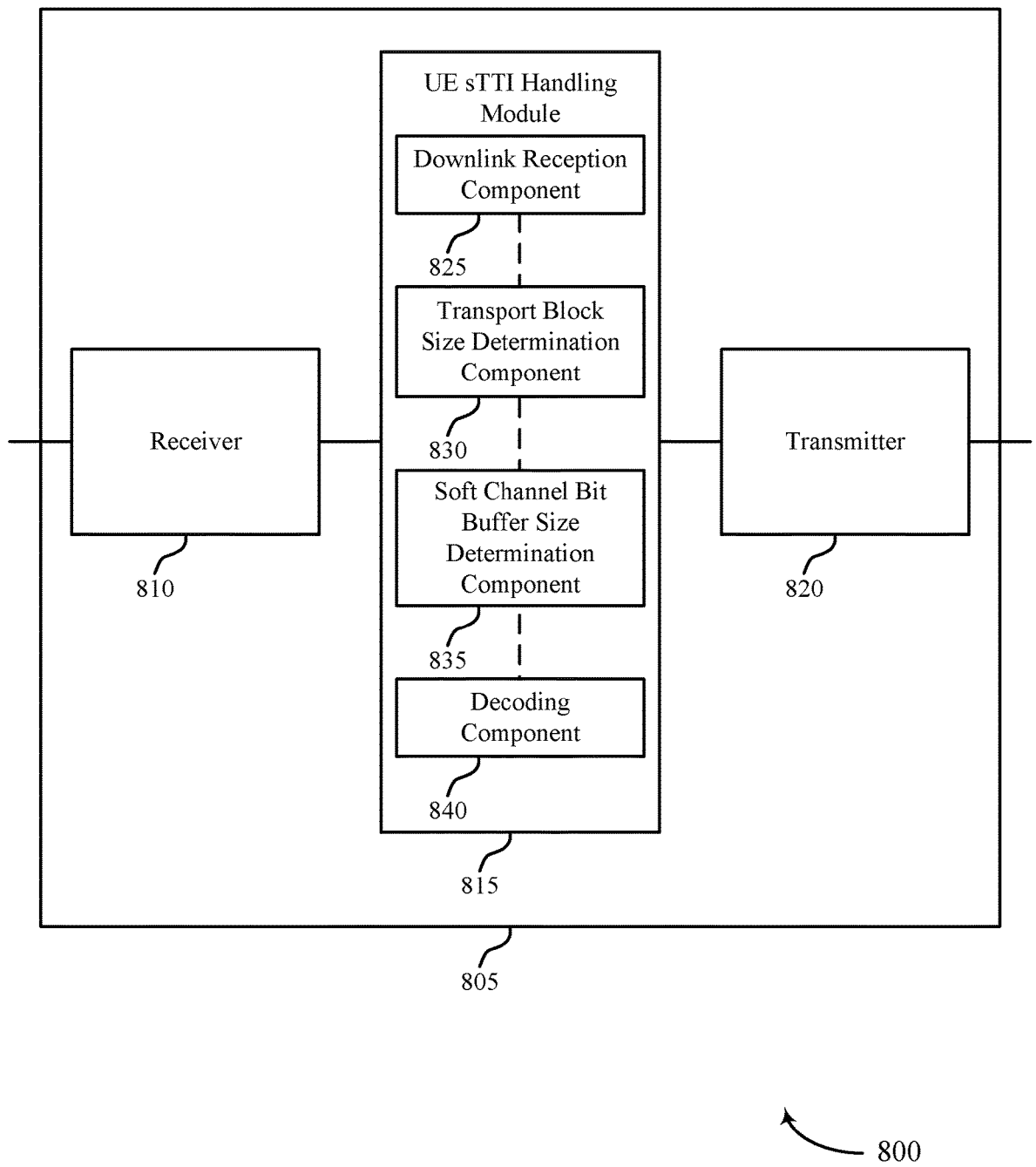

FIG. 8 shows a block diagram 800 of a wireless device 805 that supports determining transport block size, soft channel bit buffer size, and rate matching for sTTIs in accordance with aspects of the present disclosure. The wireless device 805 may be an example of aspects of a wireless device 505, 605, or 705, or a UE 115 as described with reference to FIG. 1, 2, 5, 6, or 7. The wireless device 805 may include a receiver 810, UE sTTI handling module 815, and transmitter 820. The wireless device 805 may also include a processor. Each of these components may be in communication with one another (e.g., via one or more buses).

The receiver 810 may receive information such as packets, user data, or control information associated with various information channels (e.g., control channels, data channels, and information related to determining transport block size, soft channel bit buffer size, and rate matching for sTTIs, etc.). Information may be passed on to other components of the device. The receiver 810 may be an example of aspects of the transceiver 1235 described with reference to FIG. 12. The receiver 810 may utilize a single antenna or a set of antennas.

The UE sTTI handling module 815 may be an example of aspects of the UE sTTI handling module 1215 described with reference to FIG. 12. The UE sTTI handling module 815 may also include a downlink reception component 825, transport block size determination component 830, soft channel bit buffer size determination component 835, and decoding component 840.

The downlink reception component 825 may receive one or more downlink transmissions in one or more sTTIs, each of the sTTIs corresponding to one of a set of sTTI position indexes within one or more TTIs.

The transport block size determination component 830 may determine a transport block size for a transport block of the one or more downlink transmissions.

The soft channel bit buffer size determination component 835 may determine a soft channel bit buffer size associated with the transport block based on the transport block size and a maximum soft channel bit buffer size associated with the TTI.

The decoding component 840 may decode the one or more downlink transmissions according to the determined transport block size and soft channel bit buffer size.

The transmitter 820 may transmit signals generated by other components of the device. In some examples, the transmitter 820 may be collocated with a receiver 810 in a transceiver module. For example, the transmitter 820 may be an example of aspects of the transceiver 1235 described with reference to FIG. 12. The transmitter 820 may utilize a single antenna or a set of antennas.

Figure 9:
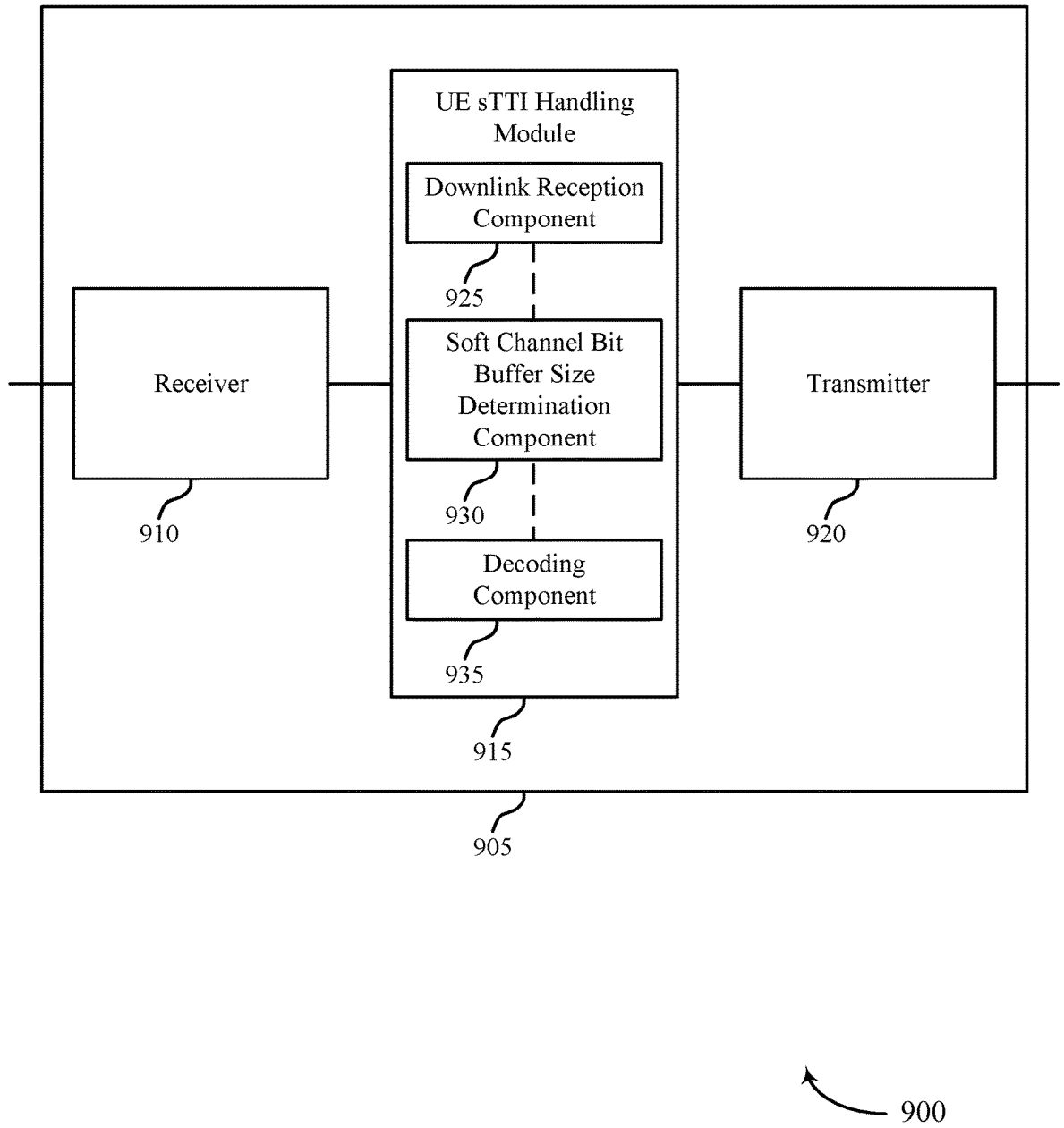

FIG. 9 shows a block diagram 900 of a wireless device 905 that supports determining transport block size, soft channel bit buffer size, and rate matching for sTTIs in accordance with aspects of the present disclosure. The wireless device 905 may be an example of aspects of a wireless device 505, 605, 705, or 805, or a UE 115 as described with reference to FIG. 1, 2, 5, 6, 7, or 8. The wireless device 905 may include a receiver 910, UE sTTI handling module 915, and transmitter 920. The wireless device 905 may also include a processor. Each of these components may be in communication with one another (e.g., via one or more buses).

The receiver 910 may receive information such as packets, user data, or control information associated with various information channels (e.g., control channels, data channels, and information related to determining transport block size, soft channel bit buffer size, and rate matching for sTTIs, etc.). Information may be passed on to other components of the device. The receiver 910 may be an example of aspects of the transceiver 1235 described with reference to FIG. 12. The receiver 910 may utilize a single antenna or a set of antennas.

The UE sTTI handling module 915 may be an example of aspects of the UE sTTI handling module 1215 described with reference to FIG. 12. The UE sTTI handling module 915 may also include a downlink reception component 925, soft channel bit buffer size determination component 930, and decoding component 935.

The downlink reception component 925 may receive one or more downlink transmissions corresponding to a transport block in one or more TTIs, where at least two of the one or more TTIs correspond to different TTI types. In some cases, the different TTI types include a one subframe TTI, a one slot sTTI, a two or three symbol sTTI, or any combination thereof.

The soft channel bit buffer size determination component 930 may determine a first soft channel bit buffer size associated with the transport block for a first decoding operation of one or more decoding operations associated with each transmission of the one or more downlink transmissions.

The decoding component 935 may decode the one or more downlink transmissions according to the first soft channel bit buffer size.

The transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
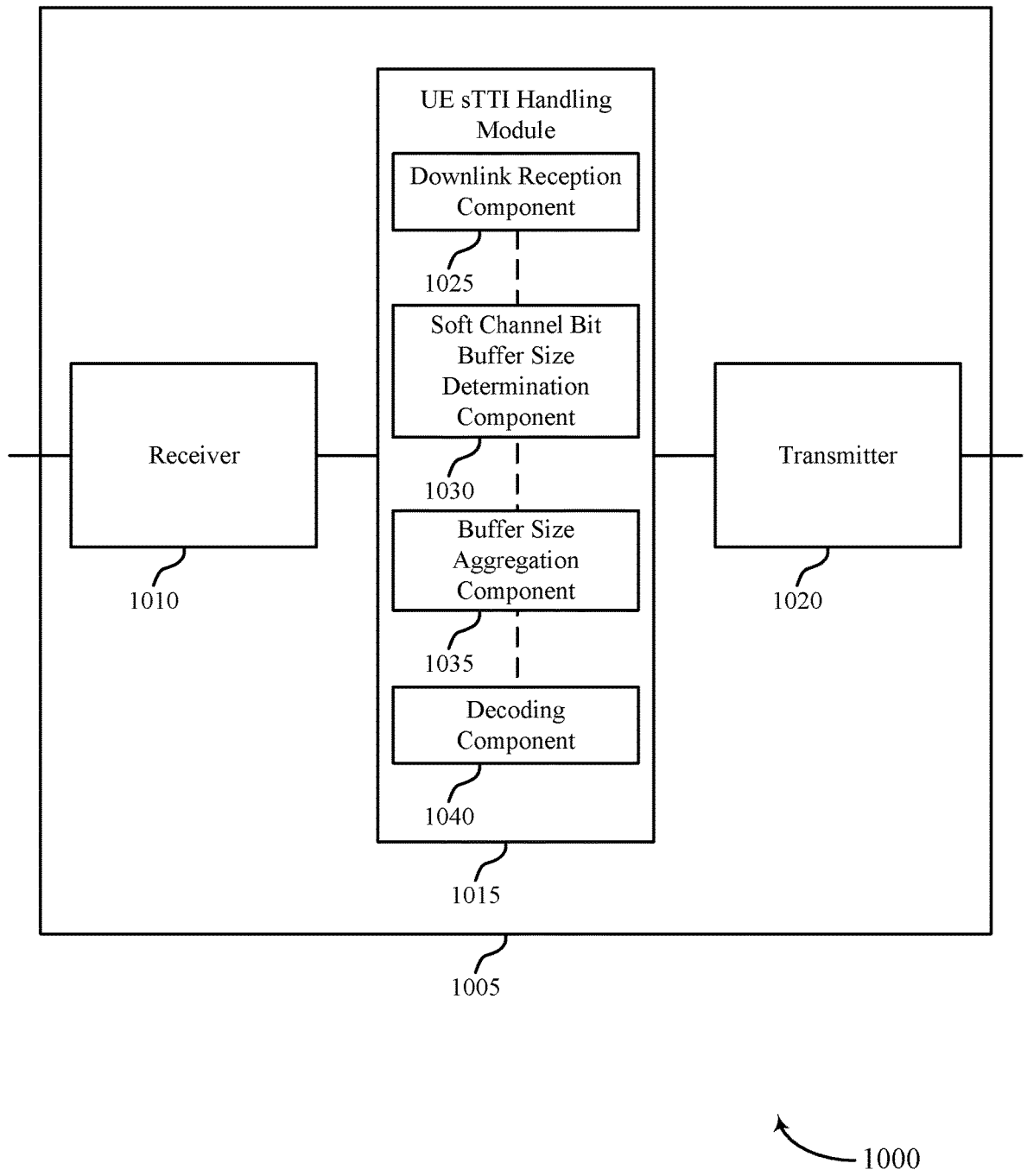

FIG. 10 shows a block diagram 1000 of a wireless device 1005 that supports determining transport block size, soft channel bit buffer size, and rate matching for sTTIs in accordance with aspects of the present disclosure. The wireless device 1005 may be an example of aspects of a wireless device 505, 605, 705, 805, or 905, or a UE 115 as described with reference to FIG. 1, 2, 5, 6, 7, 8, or 9. The wireless device 1005 may include a receiver 1010, UE sTTI handling module 1015, and transmitter 1020. The wireless device 1005 may also include a processor. Each of these components may be in communication with one another (e.g., via one or more buses).

The receiver 1010 may receive information such as packets, user data, or control information associated with various information channels (e.g., control channels, data channels, and information related to determining transport block size, soft channel bit buffer size, and rate matching for sTTIs, etc.). Information may be passed on to other components of the device. The receiver 1010 may be an example of aspects of the transceiver 1235 described with reference to FIG. 12. The receiver 1010 may utilize a single antenna or a set of antennas.

The UE sTTI handling module 1015 may be an example of aspects of the UE sTTI handling module 1215 described with reference to FIG. 12. The UE sTTI handling module 1015 may also include a downlink reception component 1025, soft channel bit buffer size determination component 1030, buffer size aggregation component 1035, and decoding component 1040.

The downlink reception component 1025 may receive one or more downlink transmissions corresponding to a transport block in one or more TTIs, where at least two of the one or more TTIs correspond to different TTI types. In some cases, the different TTI types include a one subframe TTI, a one slot sTTI, a two or three symbol sTTI, or any combination thereof.

The soft channel bit buffer size determination component 1030 may determine a soft channel bit buffer size associated with the transport block for each decoding operation of one or more decoding operations associated with the one or more downlink transmissions.

The buffer size aggregation component 1035 may aggregate the soft channel bit buffer size for each decoding operation to obtain an inter-TTI soft channel bit buffer size.

The decoding component 1040 may decode the one or more downlink transmissions according to the inter-TTI soft channel bit buffer size. In some cases, the decoding component 1040 may decode, for each decoding operation of one or more decoding operations, the one or more downlink transmissions according to an intra-TTI soft channel bit buffer size associated with a current decoding operation.

The transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
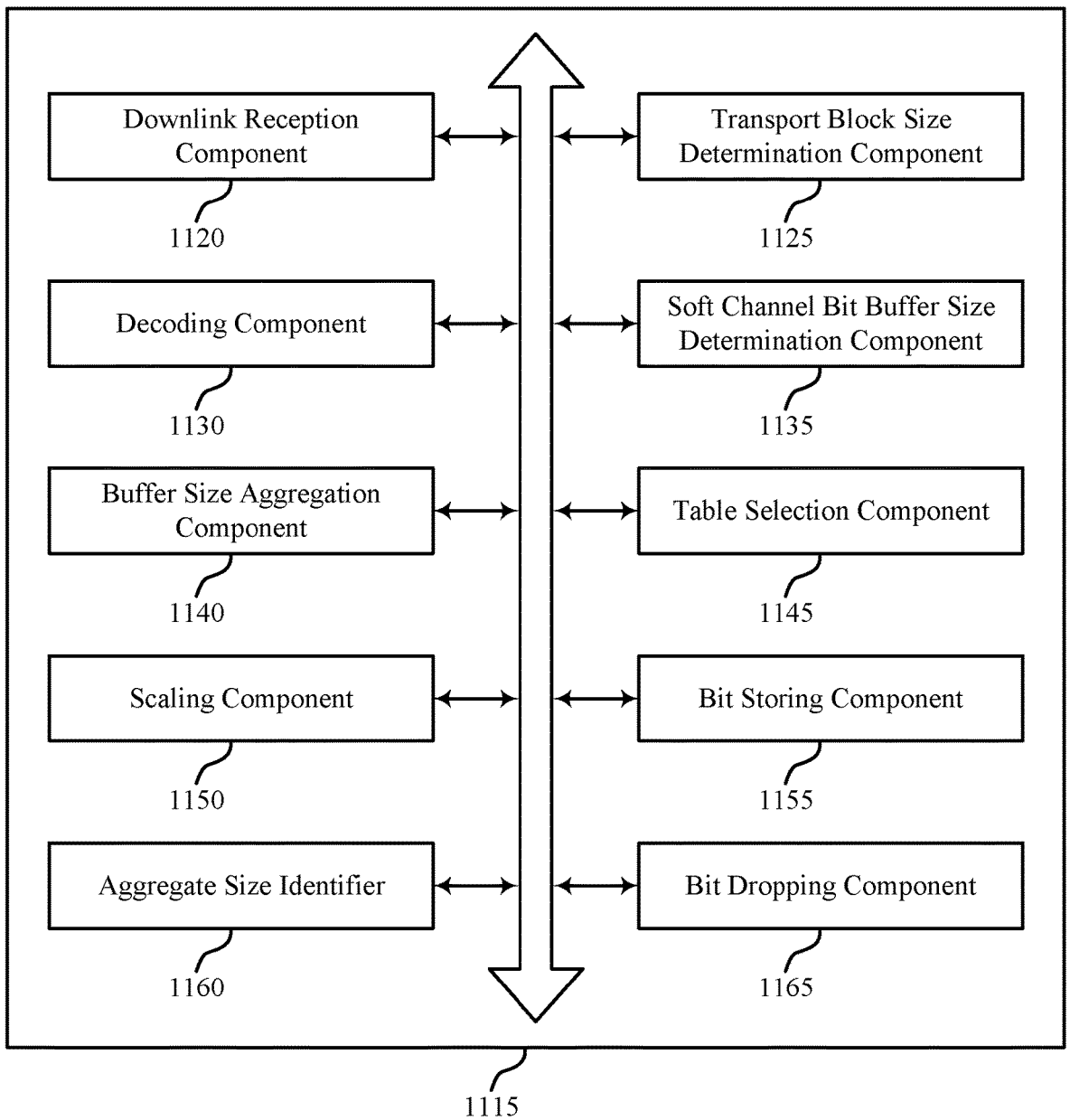
FIG. 11 shows a block diagram of a user equipment (UE) sTTI handling module that supports determining transport block size, soft channel bit buffer size, and rate matching for sTTIs in accordance with aspects of the present disclosure.

FIG. 11 shows a block diagram 1100 of a UE sTTI handling module 1115 that supports determining transport block size, soft channel bit buffer size, and rate matching for sTTIs in accordance with aspects of the present disclosure. The UE sTTI handling module 1115 may be an example of aspects of a UE sTTI handling module described with reference to FIGS. 5 through 10, and 12. The UE sTTI handling module 1115 may include a downlink reception component 1120, transport block size determination component 1125, decoding component 1130, soft channel bit buffer size determination component 1135, buffer size aggregation component 1140, table selection component 1145, scaling component 1150, bit storing component 1155, aggregate size identifier 1160, and bit dropping component 1165. Each of these modules may communicate, directly or indirectly, with one another (e.g., via one or more buses).

The downlink reception component 1120 may receive a downlink grant for a downlink transmission in an sTTI, the sTTI corresponding to one of a set of sTTI position indexes within a TTI, and the downlink grant including a resource block allocation for the downlink transmission. The downlink reception component 1120 may further receive the downlink transmission over the sTTI. In some cases, downlink reception component 1120 may receive one or more downlink transmissions in one or more sTTIs, each of the sTTIs corresponding to one of a set of sTTI position indexes within one or more TTIs. In some cases, the downlink reception component 1120 may receive one or more downlink transmissions corresponding to a transport block in one or more TTIs, where at least two of the one or more TTIs correspond to different TTI types. In some cases, the different TTI types include a one subframe TTI, a one slot sTTI, a two or three symbol sTTI, or any combination thereof.

In some cases, the downlink reception component 1120 may receive a retransmission of one or more of the received one or more downlink transmissions in the one or more sTTIs, the retransmission being in one or more retransmission TTIs. In some cases, the retransmission and the received one or more downlink transmissions overlap.

In some cases, the transport block size determination component 1125 may determine a transport block size for the downlink transmission based on scaling the resource block allocation by a scaling factor corresponding to an index of the sTTI within the set of sTTI position indexes, and applying the scaled resource block allocation to a transport block size table associated with the TTI. In some cases, the scaling factor further corresponds to a CFI, a CRS overhead, a DMRS overhead, a broadcast signal overhead, a HARQ turnaround processing time, or any combination thereof. In other cases, the transport block size determination component 1125 may determine a transport block size for the downlink transmission based on a transport block size table associated with the sTTI. In some cases, the transport block size determination component 1125 may determine a transport block size for a transport block of the one or more downlink transmissions.

In some cases, the decoding component 1130 may decode the downlink transmission according to the determined transport block size. In other cases, decoding component 1130 may decode the one or more downlink transmissions according to the determined transport block size and soft channel bit buffer size. In some cases, decoding component 1130 may decode the one or more downlink transmissions according to the first soft channel bit buffer size. In some cases, the decoding component 1130 may decode the one or more downlink transmissions according to the inter-TTI soft channel bit buffer size, and, in some examples, may decode, for each decoding operation of one or more decoding operations, the one or more downlink transmissions according to an intra-TTI soft channel bit buffer size associated with a current decoding operation. In some cases, the decoding component 1130 may decode the one or more downlink transmissions according to a determined transport block size and a scaled soft channel bit buffer size. In some cases, the decoding component 1130 may decode the retransmission according to the determined transport block size and the scaled soft channel bit buffer size. In some cases, a decoding technique used to decode the one or more downlink transmissions is different than a decoding technique used to decode the retransmission.

The soft channel bit buffer size determination component 1135 may determine a soft channel bit buffer size associated with the transport block based on the transport block size and a maximum soft channel bit buffer size associated with the TTI. In some cases, the soft bit buffer size determination component 1135 may determine a first soft channel bit buffer size associated with the transport block for a first decoding operation of one or more decoding operations associated with each transmission of the one or more downlink transmissions. In other cases, the soft bit buffer size determination component 1135 may determine a soft channel bit buffer size associated with the transport block for each decoding operation of one or more decoding operations associated with the one or more downlink transmissions.

The buffer size aggregation component 1140 may aggregate the soft channel bit buffer size for each decoding operation to obtain an inter-TTI soft channel bit buffer size.

The table selection component 1145 may select the transport block size table from a set of transport block size tables according to a length of the sTTI or an index of the sTTI. In some cases, the transport block size table is selected based on a CFI, a CRS overhead, a DMRS overhead, a broadcast signal overhead, a HARQ turnaround processing time, or any combination thereof.

In some cases, determining the transport block size for the downlink transmission may further include the scaling component 1150 scaling the resource block allocation by a scaling factor corresponding to an index of the sTTI within the set of sTTI position indexes, and applying the scaled resource block allocation to the transport block size table associated with the sTTI. In some cases, determining the soft channel bit buffer size further includes the scaling component 1150 scaling the maximum soft channel bit buffer size associated with the TTI by a scaling factor corresponding to an index of an sTTI for a first one of the one or more downlink transmissions. In some cases, the scaling component 1150 may scale the maximum soft channel bit buffer size associated with the TTI by a scaling factor corresponding to an index of an sTTI for a first one of the one or more downlink transmissions. In some cases, the scaling component 1150 may scale the maximum soft channel bit buffer size associated with the retransmission TTI based at least in part on the one or more downlink transmissions being originally transmitted in the one or more sTTIs. In some cases, the scaling component 1150 may determine a second scaling factor to scale the maximum soft channel bit buffer size associated with the retransmission TTI, wherein scaling the maximum soft channel bit buffer size associated with the retransmission TTI is scaled by the second scaling factor. In some cases, the second scaling factor is different than the first scaling factor.

In some cases, the bit storing component 1155 may determine a level of precision at which to store, in a soft channel bit buffer, a plurality of soft channel bits associated with the one or more downlink transmissions. In some cases, decoding the one or more downlink transmissions may further include the bit storing component 1155 storing, in the soft channel bit buffer, the plurality of soft channel bits associated with the one or more downlink transmissions at the determined level of precision, the determined level of precision being full precision, where a size of the soft channel bit buffer is equal to the soft channel bit buffer size. In other cases, decoding the one or more downlink transmissions may further include the bit storing component 1155 storing, in the soft channel bit buffer, the plurality of soft channel bits associated with the one or more downlink transmissions at the determined level of precision, the determined level of precision being reduced precision, wherein a size of the soft channel bit buffer is equal to the soft channel bit buffer size. In some cases, the bit storing component 1155 may combine one or more soft channel bits from respective ones of the decoded one or more downlink transmissions.

The aggregate size identifier 1160 may identify that an aggregate of soft channel bit buffer sizes for a set of HARQ processes is greater than a threshold, and may select a set of soft channel bits for at least one of the one or more downlink transmissions to skip storing in a soft channel bit buffer based on the identifying.

The bit dropping component 1165 may identify that a second decoding operation of the one or more decoding operations is associated with a second transmission in a shorter TTI than a first transmission associated with the first decoding operation and select a set of soft channel bits for at least one of the one or more downlink transmissions to skip storing in a soft channel bit buffer based on the identifying.

Figure 12:
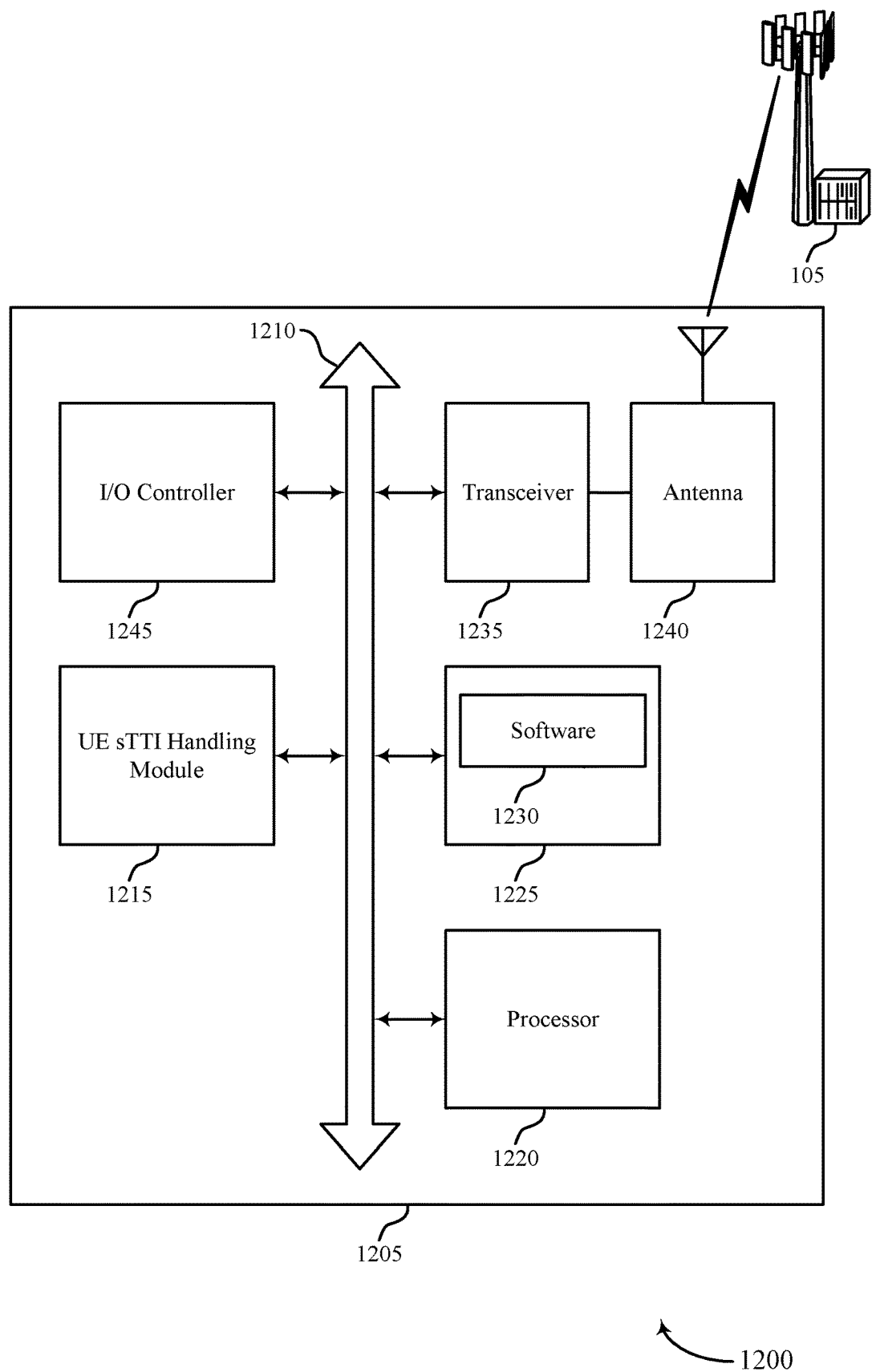
FIG. 12 illustrates a block diagram of a system including a device that supports determining transport block size, soft channel bit buffer size, and rate matching for sTTIs in accordance with aspects of the present disclosure.

FIG. 12 shows a diagram of a system 1200 including a device 1205 that supports determining transport block size, soft channel bit buffer size, and rate matching for sTTIs in accordance with aspects of the present disclosure. The device 1205 may be an example of or include the components of wireless device 505, 605, 705, 805, 905, or 1005, or a UE 115 as described above, e.g., with reference to FIGS. 1, 2, and 5 through 10. The device 1205 may include components for bi-directional voice and data communications including components for transmitting and receiving communications, including a UE sTTI handling module 1215, processor 1220, memory 1225, software 1230, transceiver 1235, antenna 1240, and I/O controller 1245. These components may be in electronic communication via one or more buses (e.g., bus 1210). The device 1205 may communicate wirelessly with one or more base stations 105.

The processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1220 may be configured to operate a memory array using a memory controller. In other cases, a memory controller may be integrated into the processor 1220. The processor 1220 may be configured to execute computer-readable instructions stored in a memory to perform various functions (e.g., functions or tasks supporting determining transport block size, soft channel bit buffer size, and rate matching for sTTIs).

The memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support determining transport block size, soft channel bit buffer size, and rate matching for sTTIs. Software 1230 may be stored in a non-transitory computer-readable medium such as system memory or other memory. In some cases, the software 1230 may not be directly executable by the processor but may cause a computer (e.g., when compiled and executed) to perform functions described herein.

The transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

The I/O controller 1245 may manage input and output signals for device 1205. The I/O controller 1245 may also manage peripherals not integrated into device 1205. In some cases, the I/O controller 1245 may represent a physical connection or port to an external peripheral. In some cases, the I/O controller 1245 may utilize an operating system such as iOS®, ANDROID®, MS-DOS®, MS-WINDOWS®, OS/2®, UNIX®, LINUX®, or another known operating system. In other cases, the I/O controller 1245 may represent or interact with a modem, a keyboard, a mouse, a touchscreen, or a similar device. In some cases, the I/O controller 1245 may be implemented as part of a processor. In some cases, a user may interact with the device 1205 via the I/O controller 1245 or via hardware components controlled by the I/O controller 1245.

Figure 13:
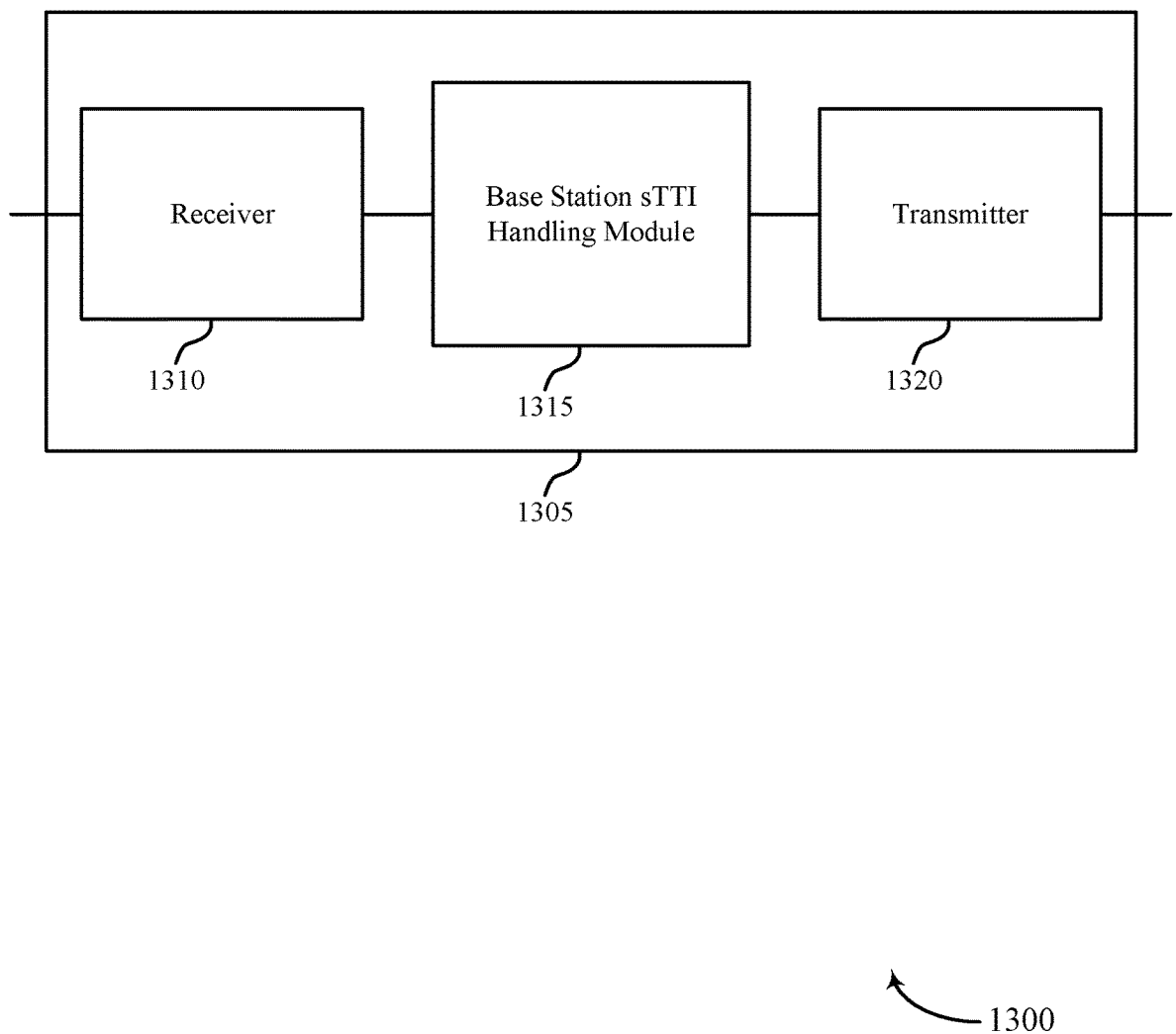
FIGS. 13 and 14 show block diagrams of wireless devices that support determining transport block size, soft channel bit buffer size, and rate matching for sTTIs in accordance with aspects of the present disclosure.

FIG. 13 shows a block diagram 1300 of a wireless device 1305 that supports determining transport block size, soft channel bit buffer size, and rate matching for sTTIs in accordance with aspects of the present disclosure. The wireless device 1305 may be an example of aspects of a base station 105 as described herein. The wireless device 1305 may include a receiver 1310, base station sTTI handling module 1315, and transmitter 1320. The wireless device 1305 may also include a processor. Each of these components may be in communication with one another (e.g., via one or more buses).

The receiver 1310 may receive information such as packets, user data, or control information associated with various information channels (e.g., control channels, data channels, and information related to determining transport block size, soft channel bit buffer size, and rate matching for sTTIs, etc.). Information may be passed on to other components of the device. The receiver 1310 may be an example of aspects of the transceiver 1635 described with reference to FIG. 16. The receiver 1310 may utilize a single antenna or a set of antennas.

The base station sTTI handling module 1315 may be an example of aspects of the base station sTTI handling module 1615 described with reference to FIG. 16. The base station sTTI handling module 1315 and/or at least some of its various sub-components may be implemented in hardware, software executed by a processor, firmware, or any combination thereof. If implemented in software executed by a processor, the functions of the base station sTTI handling module 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station sTTI handling module 1315 and/or at least some of its various sub-components may be physically located at various positions, including being distributed such that portions of functions are implemented at different physical locations by one or more physical devices. In some examples, the base station sTTI handling module 1315 and/or at least some of its various sub-components may be a separate and distinct component in accordance with aspects of the present disclosure. In other examples, base station sTTI handling module 1315 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

The base station sTTI handling module 1315 may determine, in a TTI, an sTTI for transmission, the sTTI corresponding to one of a set of sTTI position indexes within the TTI, select a CQI-to-MCS mapping based on the determined sTTI for transmission, transmit a downlink grant for a downlink transmission in the sTTI, the downlink grant including a resource block allocation for the downlink transmission and an MCS indicator determined based on the CQI-to-MCS mapping, and transmit the downlink transmission over the sTTI.

The transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
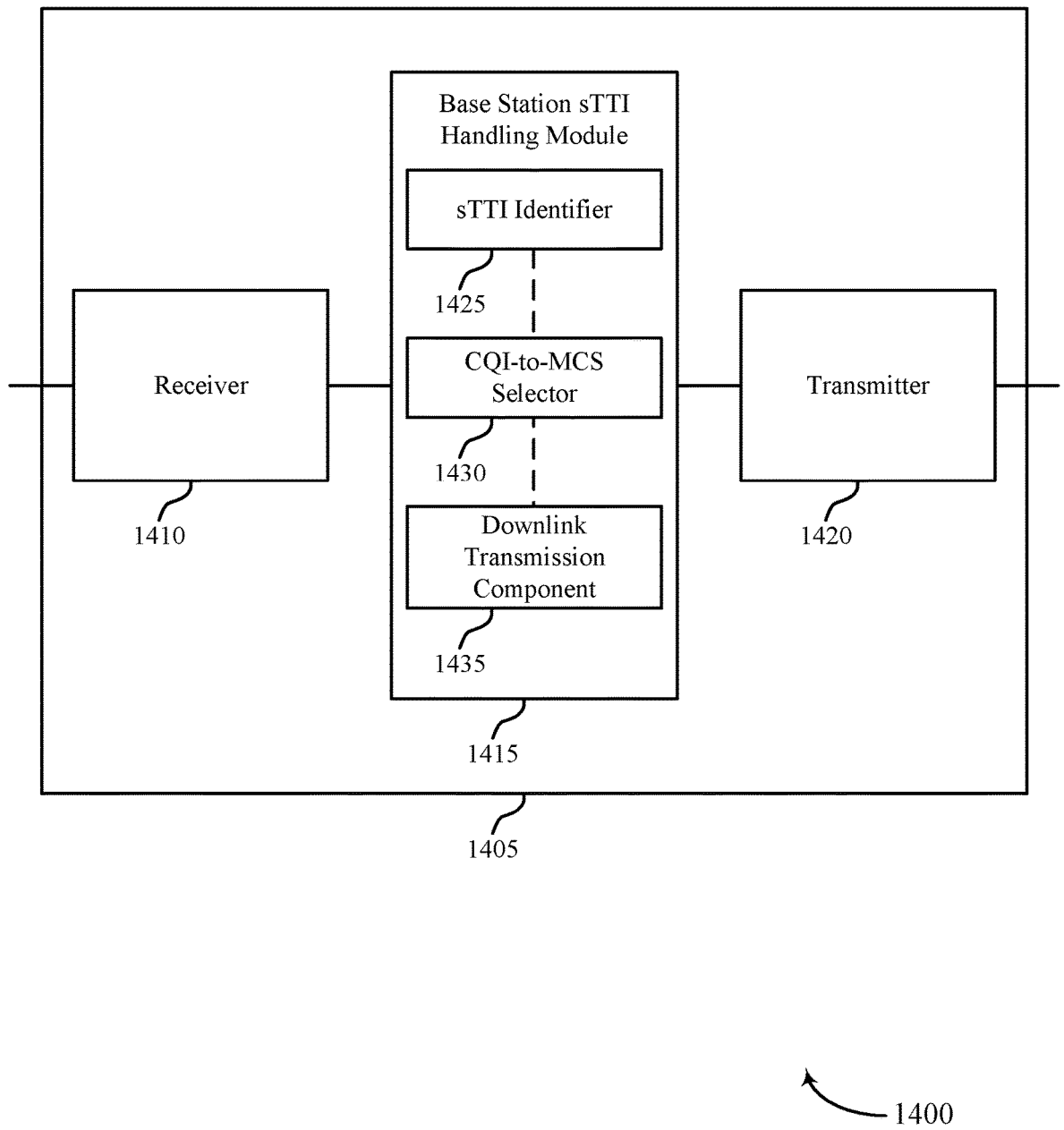

FIG. 14 shows a block diagram 1400 of a wireless device 1405 that supports determining transport block size, soft channel bit buffer size, and rate matching for sTTIs in accordance with aspects of the present disclosure. The wireless device 1405 may be an example of aspects of a wireless device 1305 or a base station 105 as described with reference to FIGS. 1, 2, and 13. The wireless device 1405 may include a receiver 1410, base station sTTI handling module 1415, and transmitter 1420. The wireless device 1405 may also include a processor. Each of these components may be in communication with one another (e.g., via one or more buses).

The receiver 1410 may receive information such as packets, user data, or control information associated with various information channels (e.g., control channels, data channels, and information related to determining transport block size, soft channel bit buffer size, and rate matching for sTTIs, etc.). Information may be passed on to other components of the device. The receiver 1410 may be an example of aspects of the transceiver 1635 described with reference to FIG. 16. The receiver 1410 may utilize a single antenna or a set of antennas.

The base station sTTI handling module 1415 may be an example of aspects of the base station sTTI handling module 1615 described with reference to FIG. 16. The base station sTTI handling module 1415 may also include sTTI identifier 1425, CQI-to-MCS selector 1430, and downlink transmission component 1435.

The sTTI identifier 1425 may determine, in a TTI, an sTTI for transmission, the sTTI corresponding to one of a set of sTTI position indexes within the TTI. The CQI-to-MCS selector 1430 may select a CQI-to-MCS mapping based on the determined sTTI for transmission. In some cases, the CQI-to-MCS mapping is selected based on a CFI, a CRS overhead, a DMRS overhead, a broadcast signal overhead, a HARQ turnaround processing time, or any combination thereof.

The downlink transmission component 1435 may transmit a downlink grant for a downlink transmission in the sTTI, the downlink grant including a resource block allocation for the downlink transmission and an MCS indicator determined based on the CQI-to-MCS mapping, and may transmit the downlink transmission over the sTTI.

The transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
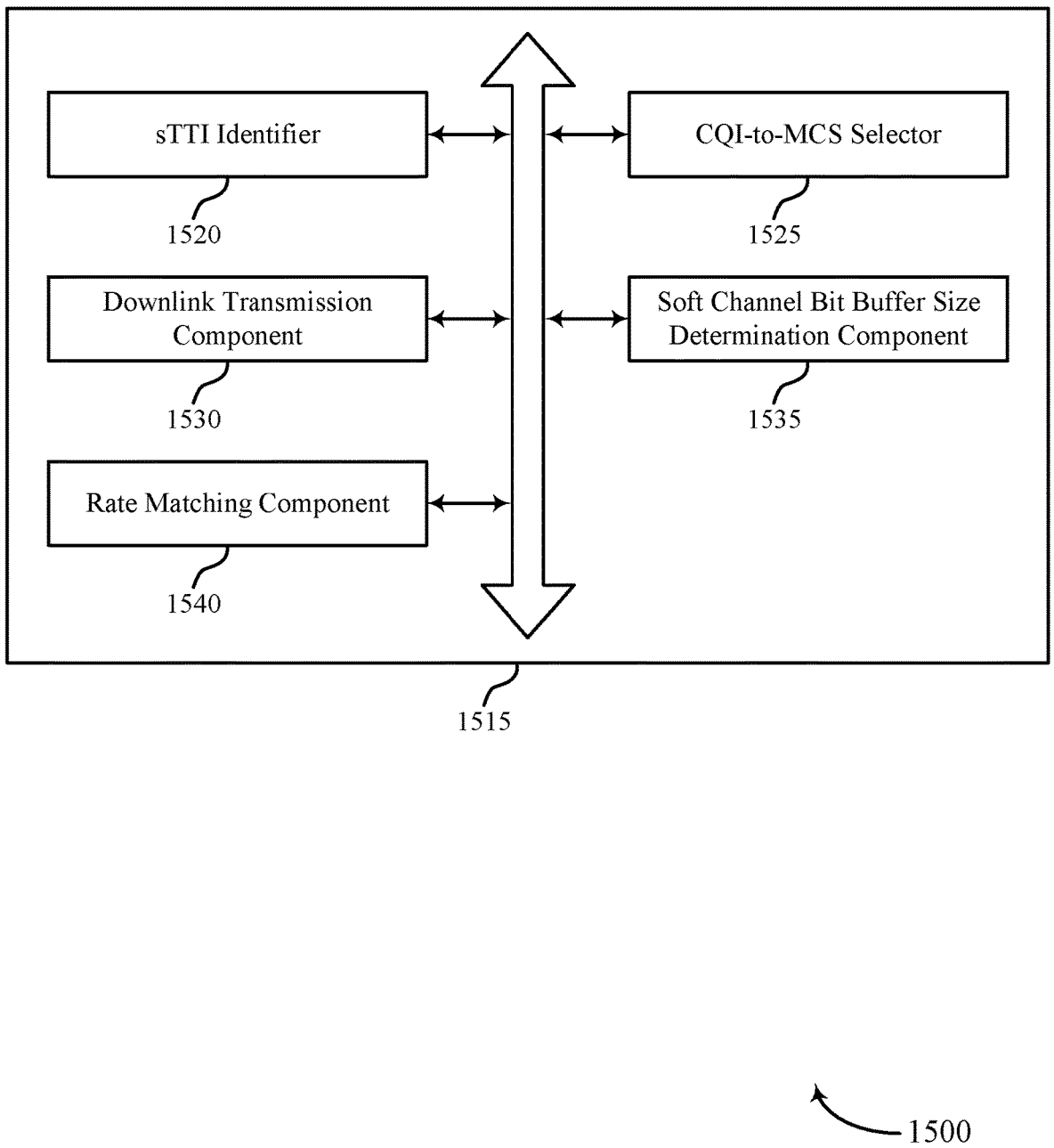
FIG. 15 shows a block diagram of a base station sTTI handling module that supports determining transport block size, soft channel bit buffer size, and rate matching for sTTIs in accordance with aspects of the present disclosure.

FIG. 15 shows a block diagram 1500 of a base station sTTI handling module 1515 that supports determining transport block size, soft channel bit buffer size, and rate matching for sTTIs in accordance with aspects of the present disclosure. The base station sTTI handling module 1515 may be an example of aspects of a base station sTTI handling module 1315, 1415, or 1615 described with reference to FIGS. 13, 14, and 16. The base station sTTI handling module 1515 may include a sTTI identifier 1520, CQI-to-MCS selector 1525, downlink transmission component 1530, soft channel bit buffer size determination component 1535, and rate matching component 1540. Each of these modules may communicate, directly or indirectly, with one another (e.g., via one or more buses).

The sTTI identifier 1520 may determine, in a TTI, an sTTI for transmission, the sTTI corresponding to one of a set of sTTI position indexes within the TTI. The CQI-to-MCS selector 1525 may select a CQI-to-MCS mapping based on the determined sTTI for transmission. In some cases, the CQI-to-MCS mapping is selected based on a CFI, a CRS overhead, a DMRS overhead, a broadcast signal overhead, a HARQ turnaround processing time, or any combination thereof.

The downlink transmission component 1530 may transmit a downlink grant for a downlink transmission in the sTTI, the downlink grant including a resource block allocation for the downlink transmission and an MCS indicator determined based on the CQI-to-MCS mapping, and may transmit the downlink transmission over the sTTI.

The soft channel bit buffer size determination component 1535 may determine a soft channel bit buffer size based on the determined sTTI for transmission. Rate matching component 1540 may perform rate matching according to the soft channel bit buffer size.

Figure 16:
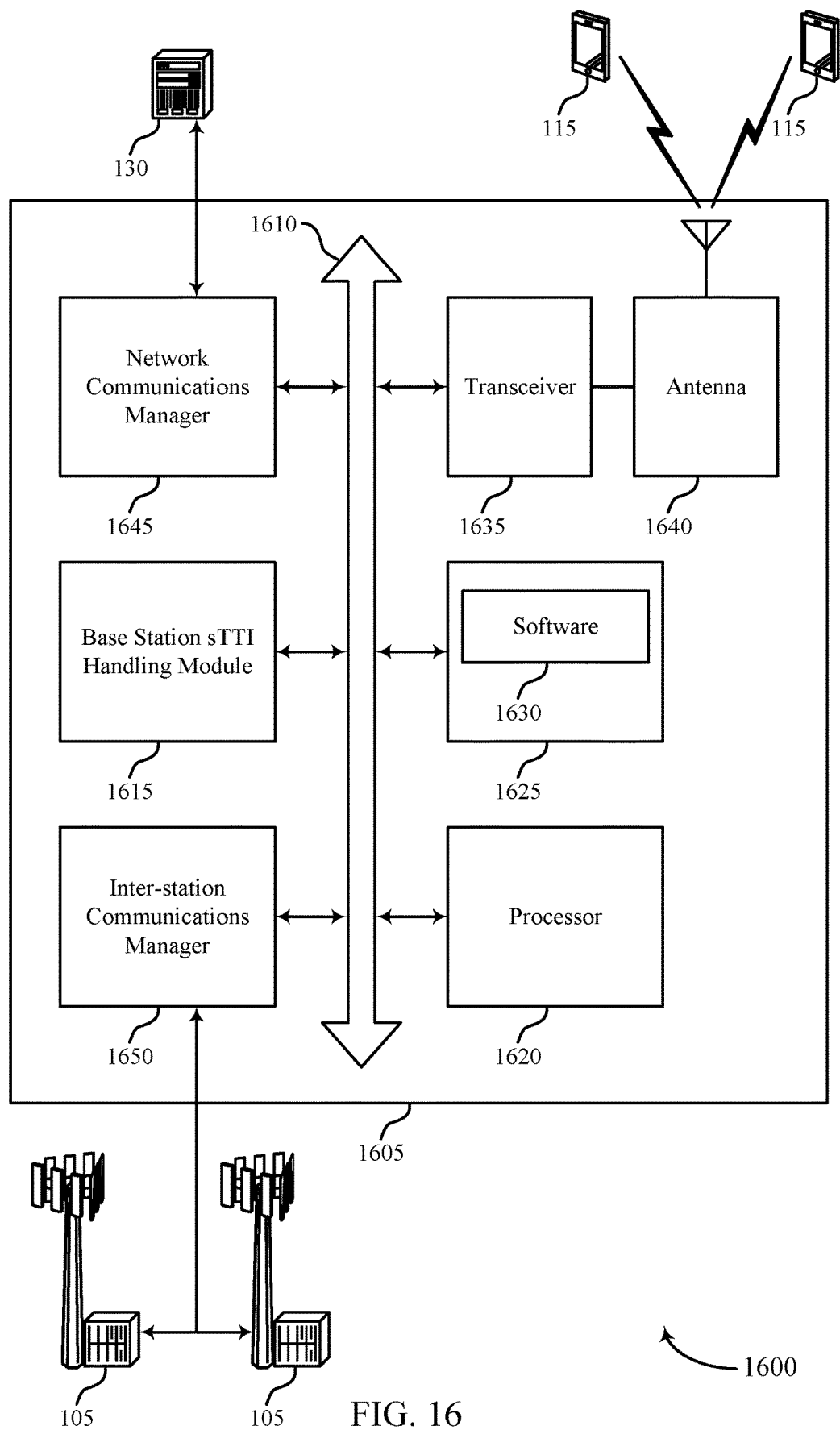
FIG. 16 illustrates a block diagram of a system including a device that supports determining transport block size, soft channel bit buffer size, and rate matching for sTTIs in accordance with aspects of the present disclosure.

FIG. 16 shows a diagram of a system 1600 including a device 1605 that supports determining transport block size, soft channel bit buffer size, and rate matching for sTTIs in accordance with aspects of the present disclosure. The device 1605 may be an example of or include the components of base station 105 as described above, e.g., with reference to FIGS. 1 and 2. The device 1605 may include components for bi-directional voice and data communications including components for transmitting and receiving communications, including a base station sTTI handling module 1615, processor 1620, memory 1625, software 1630, transceiver 1635, antenna 1640, network communications manager 1645, and inter-station communications manager 1650. These components may be in electronic communication via one or more buses (e.g., bus 1610). The device 1605 may communicate wirelessly with one or more UEs 115.

The processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1620 may be configured to operate a memory array using a memory controller. In other cases, a memory controller may be integrated into the processor 1620. The processor 1620 may be configured to execute computer-readable instructions stored in a memory to perform various functions (e.g., functions or tasks supporting determining transport block size, soft channel bit buffer size, and rate matching for sTTIs).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support determining transport block size, soft channel bit buffer size, and rate matching for sTTIs. Software 1630 may be stored in a non-transitory computer-readable medium such as system memory or other memory. In some cases, the software 1630 may not be directly executable by the processor but may cause a computer (e.g., when compiled and executed) to perform functions described herein.

The transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

The network communications manager 1645 may manage communications with the core network (e.g., via one or more wired backhaul links). For example, the network communications manager 1645 may manage the transfer of data communications for client devices, such as one or more UEs 115.

The inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
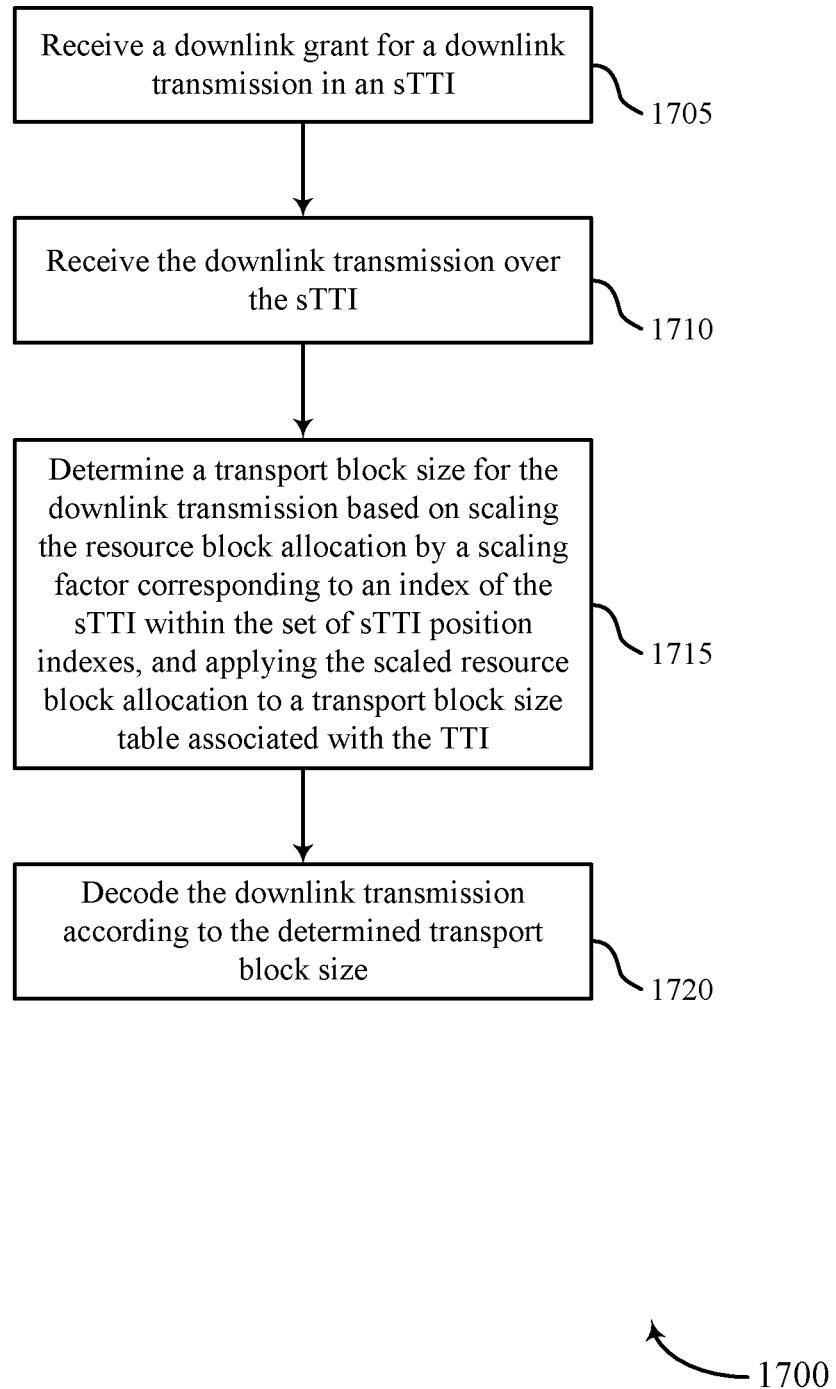
FIGS. 17 through 23 show flowcharts illustrating methods for determining transport block size, soft channel bit buffer size, and rate matching for sTTIs in accordance with aspects of the present disclosure.

FIG. 17 shows a flowchart illustrating a method 1700 for determining transport block size, soft channel bit buffer size, and rate matching for sTTIs in accordance with aspects of the present disclosure. The operations of method 1700 may be implemented by a UE 115 or its components as described herein. For example, the operations of method 1700 may be performed by a UE sTTI handling module as described with reference to FIGS. 5 through 12. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a downlink grant for a downlink transmission in an sTTI, the sTTI corresponding to one of a plurality of sTTI position indexes within a TTI, and the downlink grant comprising a resource block allocation for the downlink transmission. The operations of 1705 may be performed according to the methods described herein. In certain examples, aspects of the operations of 1705 may be performed by a downlink reception component as described with reference to FIGS. 5, 6, 11, and 12.

At 1710 the UE 115 may receive the downlink transmission over the sTTI. The operations of 1710 may be performed according to the methods described herein. In certain examples, aspects of the operations of 1710 may be performed by a downlink reception component as described with reference to FIGS. 5, 6, 11, and 12.

At 1715 the UE 115 may determine a transport block size for the downlink transmission based at least in part on scaling the resource block allocation by a scaling factor corresponding to an index of the sTTI within the plurality of sTTI position indexes, and applying the scaled resource block allocation to a transport block size table associated with the TTI. The operations of 1715 may be performed according to the methods described herein. In certain examples, aspects of the operations of 1715 may be performed by a transport block size determination component as described with reference to FIGS. 5, 6, 11, and 12.

At 1720 the UE 115 may decode the downlink transmission according to the determined transport block size. The operations of 1720 may be performed according to the methods described herein. In certain examples, aspects of the operations of 1720 may be performed by a decoding component as described with reference to FIGS. 5, 6, 11, and 12.

Figure 18:
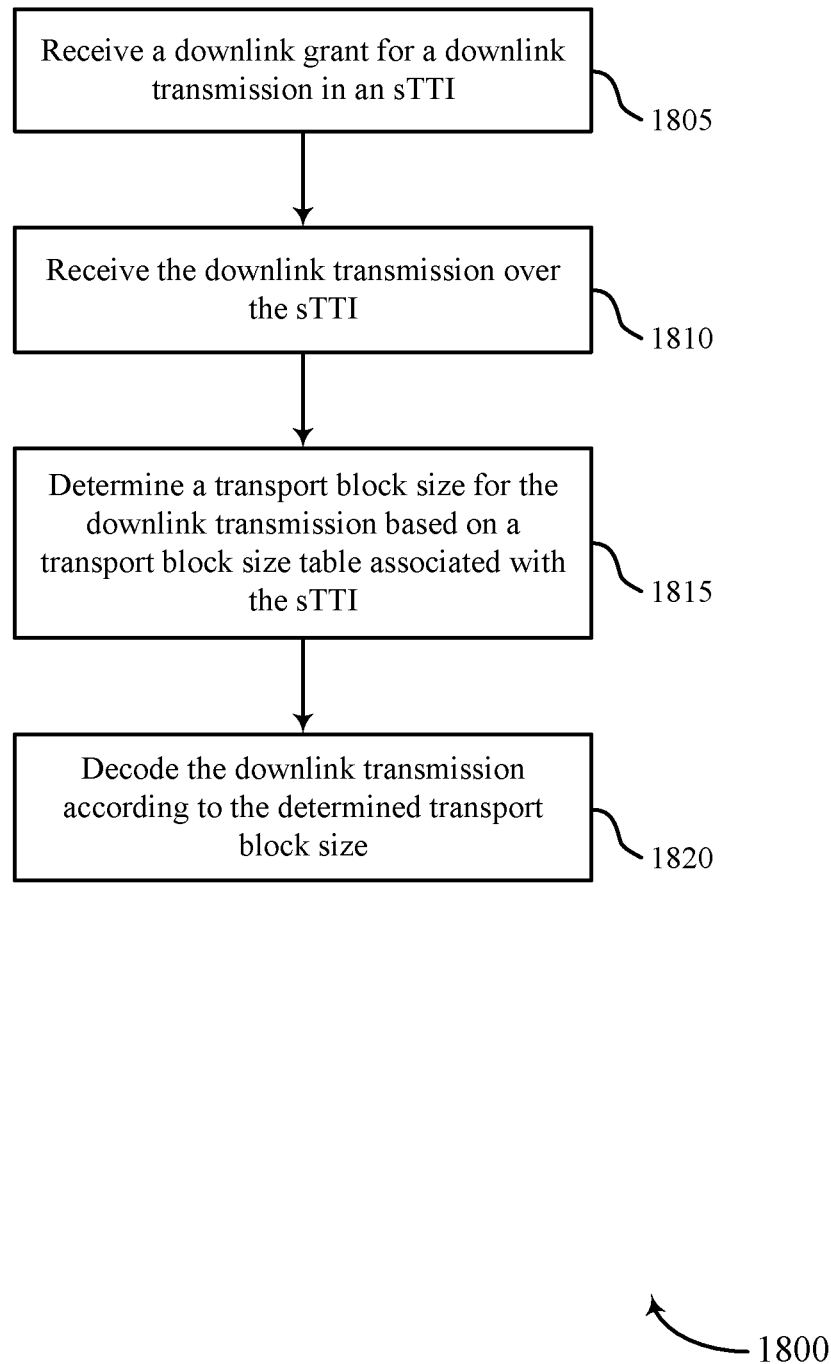

FIG. 18 shows a flowchart illustrating a method 1800 for determining transport block size, soft channel bit buffer size, and rate matching for sTTIs in accordance with aspects of the present disclosure. The operations of method 1800 may be implemented by a UE 115 or its components as described herein. For example, the operations of method 1800 may be performed by a UE sTTI handling module as described with reference to FIGS. 5 through 12. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive a downlink grant for a downlink transmission in an sTTI, the sTTI corresponding to one of a plurality of sTTI position indexes within a TTI, the downlink grant comprising a resource block allocation for the downlink transmission. The operations of 1805 may be performed according to the methods described herein. In certain examples, aspects of the operations of 1805 may be performed by a downlink reception component as described with reference to FIGS. 5, 7, 11, and 12.

At 1810 the UE 115 may receive the downlink transmission over the sTTI. The operations of 1810 may be performed according to the methods described herein. In certain examples, aspects of the operations of 1810 may be performed by a downlink reception component as described with reference to FIGS. 5, 7, 11, and 12.

At 1815 the UE 115 may determine a transport block size for the downlink transmission based at least in part on a transport block size table associated with the sTTI. The operations of 1815 may be performed according to the methods described herein. In certain examples, aspects of the operations of 1815 may be performed by a transport block size determination component as described with reference to FIGS. 5, 7, 11, and 12.

At 1820 the UE 115 may decode the downlink transmission according to the determined transport block size. The operations of 1820 may be performed according to the methods described herein. In certain examples, aspects of the operations of 1820 may be performed by a decoding component as described with reference to FIGS. 5, 7, 11, and 12.

Figure 19:
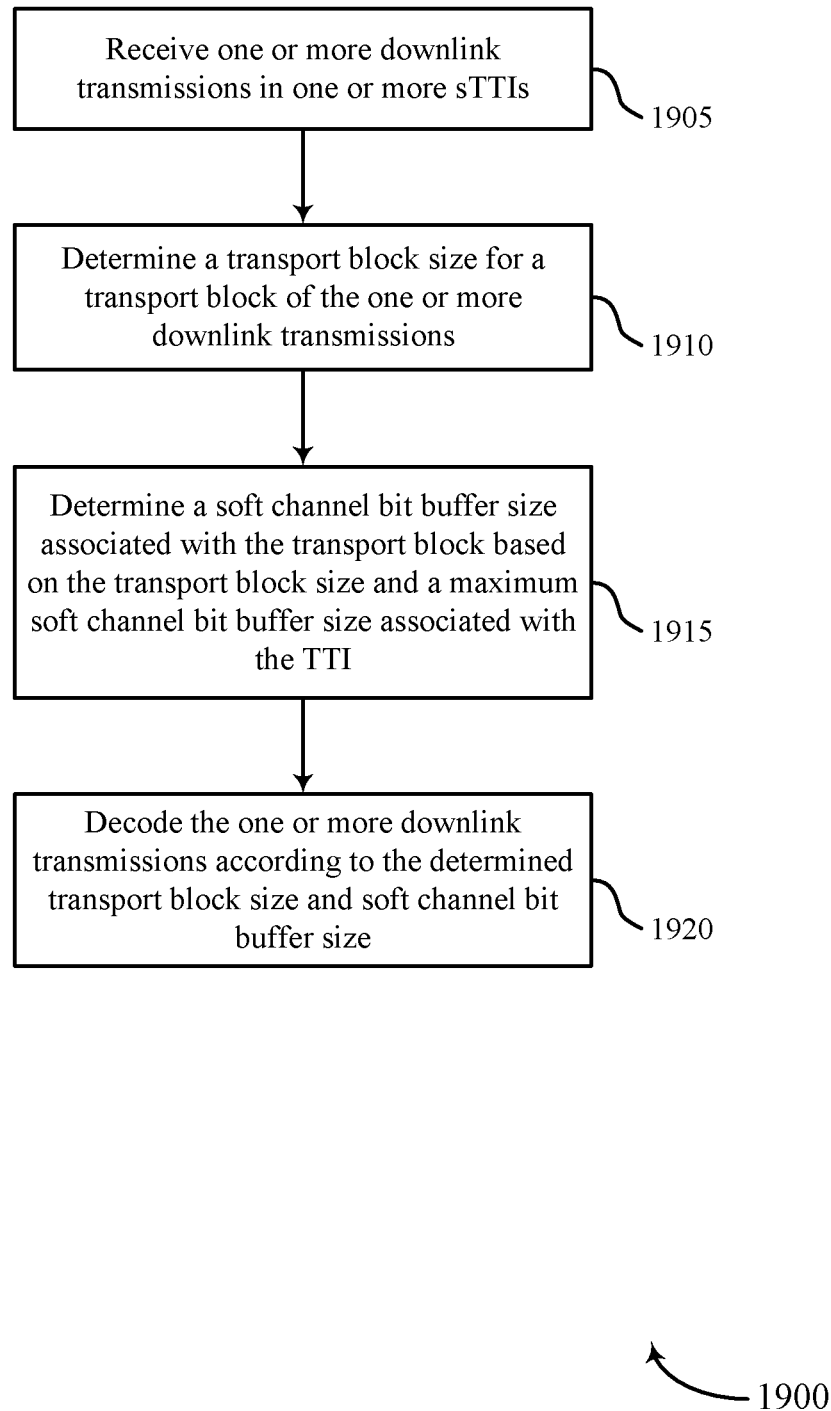

FIG. 19 shows a flowchart illustrating a method 1900 for determining transport block size, soft channel bit buffer size, and rate matching for sTTIs in accordance with aspects of the present disclosure. The operations of method 1900 may be implemented by a UE 115 or its components as described herein. For example, the operations of method 1900 may be performed by a UE sTTI handling module as described with reference to FIGS. 5 through 12. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive one or more downlink transmissions in one or more sTTIs, each of the sTTIs corresponding to one of a plurality of sTTI position indexes within one or more TTIs. The operations of 1905 may be performed according to the methods described herein. In certain examples, aspects of the operations of 1905 may be performed by a downlink reception component as described with reference to FIGS. 5, 8, 11, and 12.

At 1910 the UE 115 may determine a transport block size for a transport block of the one or more downlink transmissions. The operations of 1910 may be performed according to the methods described herein. In certain examples, aspects of the operations of 1910 may be performed by a transport block size determination component as described with reference to FIGS. 5, 8, 11, and 12.

At 1915 the UE 115 may determine a soft channel bit buffer size associated with the transport block based on the transport block size and a maximum soft channel bit buffer size associated with the TTI. The operations of 1915 may be performed according to the methods described herein. In certain examples, aspects of the operations of 1915 may be performed by a soft channel bit buffer size determination component as described with reference to FIGS. 5, 8, 11, and 12.

At 1920 the UE 115 may decode the one or more downlink transmissions according to the determined transport block size and soft channel bit buffer size. The operations of 1920 may be performed according to the methods described herein. In certain examples, aspects of the operations of 1920 may be performed by a decoding component as described with reference to FIGS. 5, 8, 11, and 12.

Figure 20:
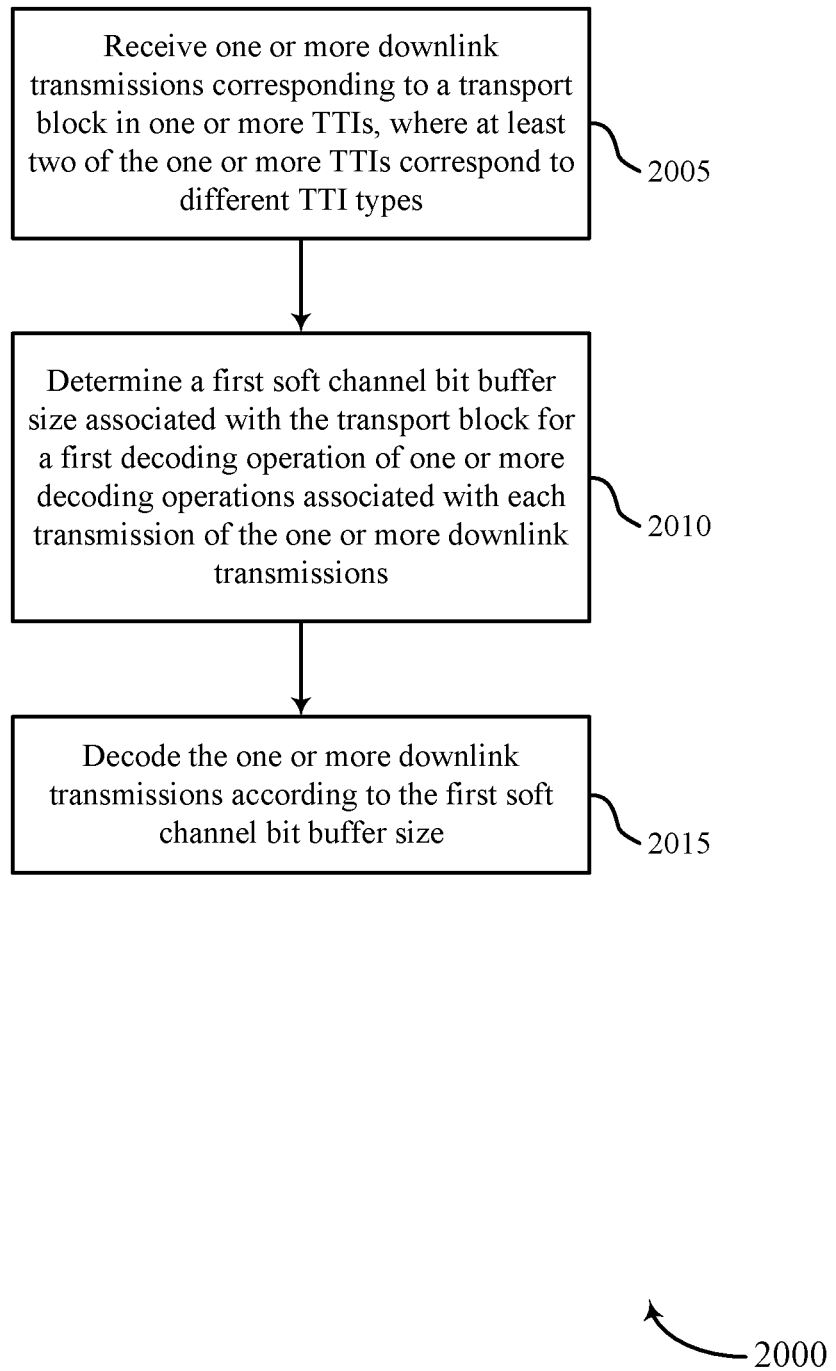

FIG. 20 shows a flowchart illustrating a method 2000 for determining transport block size, soft channel bit buffer size, and rate matching for sTTIs in accordance with aspects of the present disclosure. The operations of method 2000 may be implemented by a UE 115 or its components as described herein. For example, the operations of method 2000 may be performed by a UE sTTI handling module as described with reference to FIGS. 5 through 12. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may receive one or more downlink transmissions corresponding to a transport block in one or more TTIs, wherein at least two of the one or more TTIs correspond to different TTI types. The operations of 2005 may be performed according to the methods described herein. In certain examples, aspects of the operations of 2005 may be performed by a downlink reception component as described with reference to FIGS. 5, 9, 11, and 12.

At 2010 the UE 115 may determine a first soft channel bit buffer size associated with the transport block for a first decoding operation of one or more decoding operations associated with each transmission of the one or more downlink transmissions. The operations of 2010 may be performed according to the methods described herein. In certain examples, aspects of the operations of 2010 may be performed by a soft channel bit buffer size determination component as described with reference to FIGS. 5, 9, 11, and 12.

At 2015 the UE 115 may decode the one or more downlink transmissions according to the first soft channel bit buffer size. The operations of 2015 may be performed according to the methods described herein. In certain examples, aspects of the operations of 2015 may be performed by a decoding component as described with reference to FIGS. 5, 9, 11, and 12.

Figure 21:
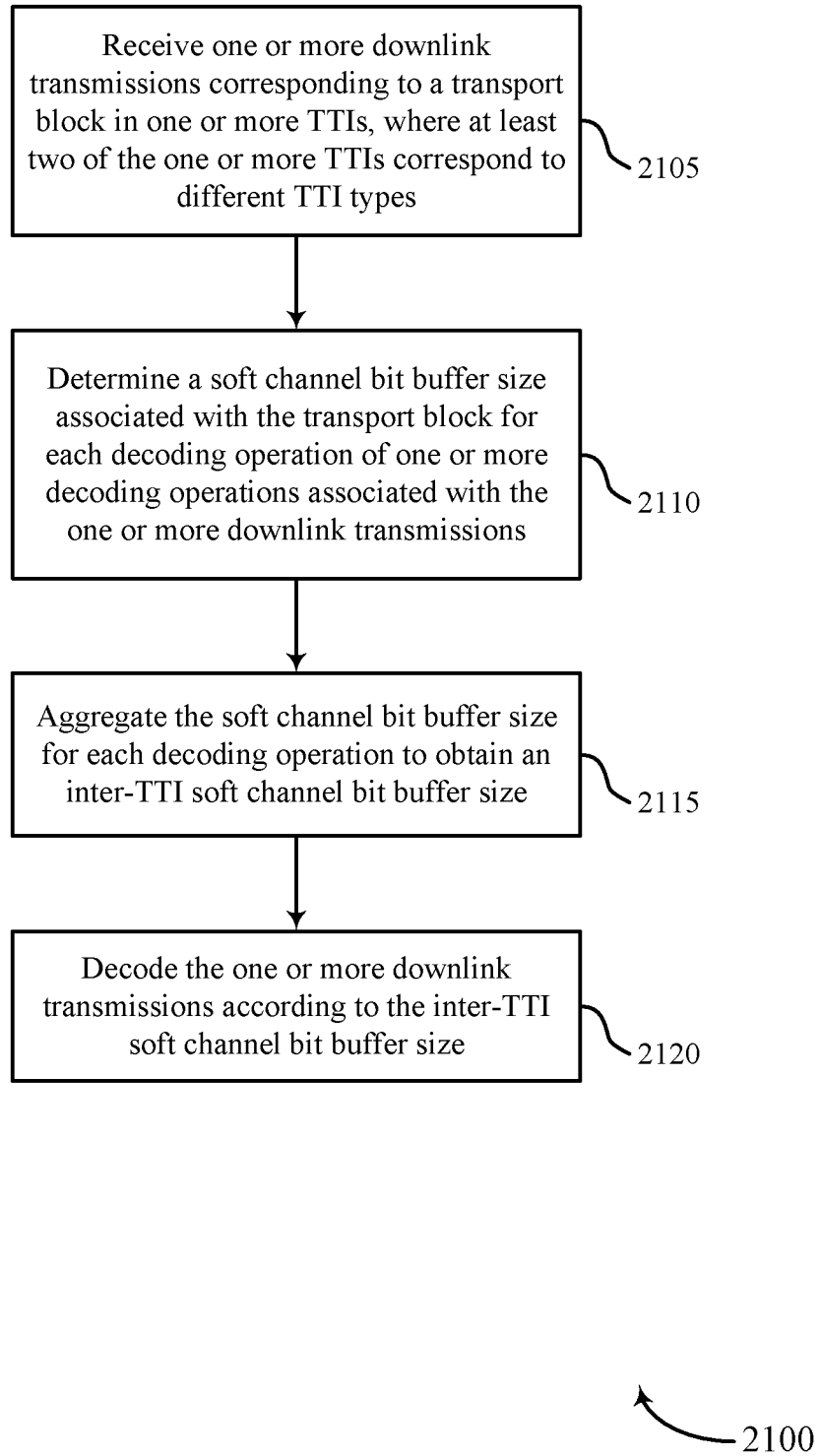

FIG. 21 shows a flowchart illustrating a method 2100 for determining transport block size, soft channel bit buffer size, and rate matching for sTTIs in accordance with aspects of the present disclosure. The operations of method 2100 may be implemented by a UE 115 or its components as described herein. For example, the operations of method 2100 may be performed by a UE sTTI handling module as described with reference to FIGS. 5 through 12. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may receive one or more downlink transmissions corresponding to a transport block in one or more TTIs, wherein at least two of the one or more TTIs correspond to different TTI types. The operations of 2105 may be performed according to the methods described herein. In certain examples, aspects of the operations of 2105 may be performed by a downlink reception component as described with reference to FIGS. 5 and 10 through 12.

At 2110 the UE 115 may determine a soft channel bit buffer size associated with the transport block for each decoding operation of one or more decoding operations associated with the one or more downlink transmissions. The operations of 2110 may be performed according to the methods described herein. In certain examples, aspects of the operations of 2110 may be performed by a soft channel bit buffer size determination component as described with reference to FIGS. 5 and 10 through 12.

At 2115 the UE 115 may aggregate the soft channel bit buffer size for each decoding operation to obtain an inter-TTI soft channel bit buffer size. The operations of 2115 may be performed according to the methods described herein. In certain examples, aspects of the operations of 2115 may be performed by a buffer size aggregation component as described with reference to FIGS. 5 and 10 through 12.

At 2120 the UE 115 may decode the one or more downlink transmissions according to the inter-TTI soft channel bit buffer size. The operations of 2120 may be performed according to the methods described herein. In certain examples, aspects of the operations of 2120 may be performed by a decoding component as described with reference to FIGS. 5 and 10 through 12.

Figure 22:
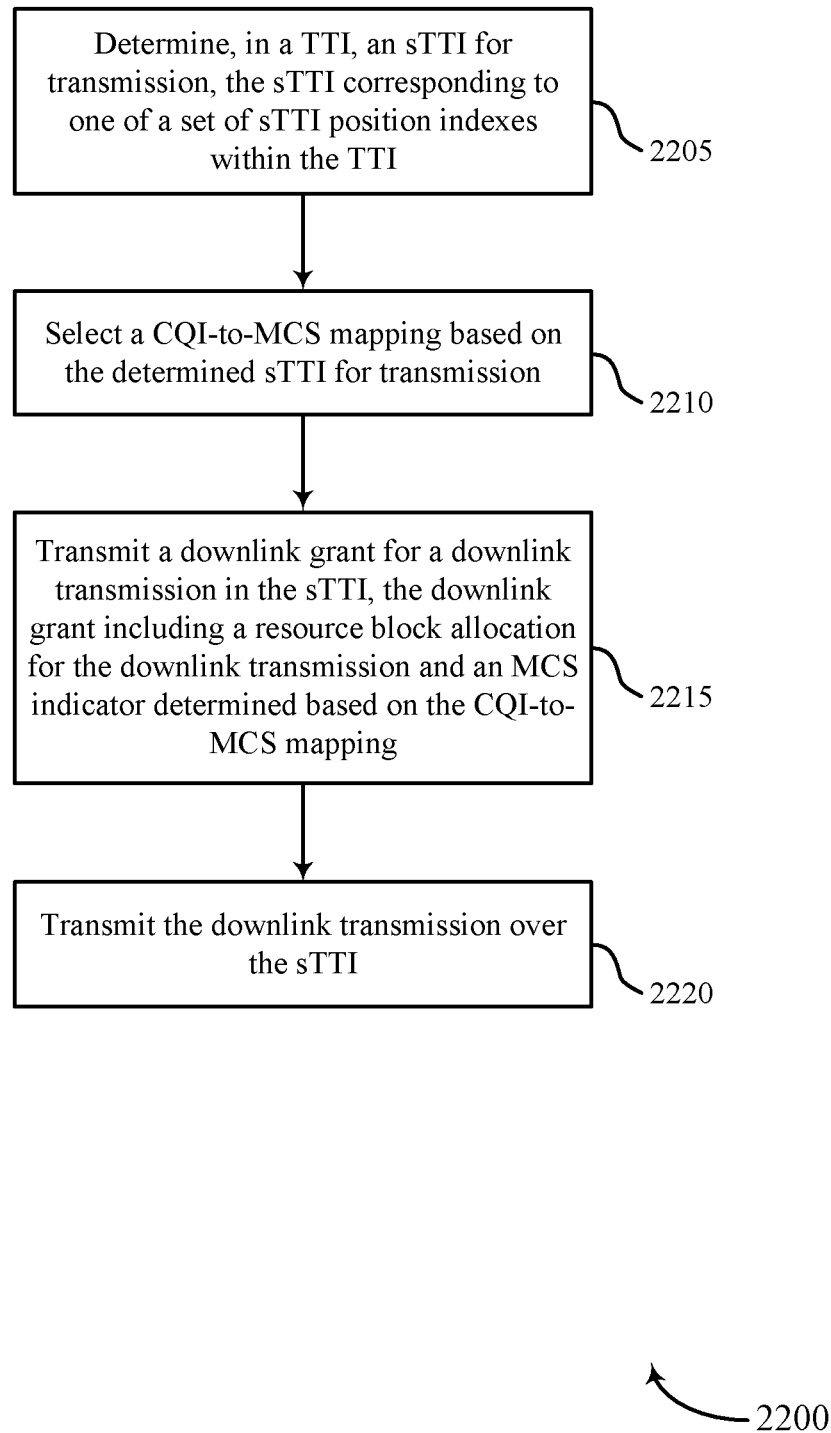

FIG. 22 shows a flowchart illustrating a method 2200 for determining transport block size, soft channel bit buffer size, and rate matching for sTTIs in accordance with aspects of the present disclosure. The operations of method 2200 may be implemented by a base station 105 or its components as described herein. For example, the operations of method 2200 may be performed by a base station sTTI handling module as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may determine, in a TTI, an sTTI for transmission, the sTTI corresponding to one of a plurality of sTTI position indexes within the TTI. The operations of 2205 may be performed according to the methods described herein. In certain examples, aspects of the operations of 2205 may be performed by an sTTI identifier as described with reference to FIGS. 13 through 16.

At 2210 the base station 105 may select a CQI-to-MCS mapping based at least in part on the determined sTTI for transmission. The operations of 2210 may be performed according to the methods described herein. In certain examples, aspects of the operations of 2210 may be performed by a CQI-to-MCS selector as described with reference to FIGS. 13 through 16.

At 2215 the base station 105 may transmit a downlink grant for a downlink transmission in the sTTI, the downlink grant comprising a resource block allocation for the downlink transmission and an MCS indicator determined based at least in part on the CQI-to-MCS mapping. The operations of 2215 may be performed according to the methods described herein. In certain examples, aspects of the operations of 2215 may be performed by a downlink transmission component as described with reference to FIGS. 13 through 16.

At 2220 the base station 105 may transmit the downlink transmission over the sTTI. The operations of 2220 may be performed according to the methods described herein. In certain examples, aspects of the operations of 2220 may be performed by a downlink transmission component as described with reference to FIGS. 13 through 16.

Figure 23:
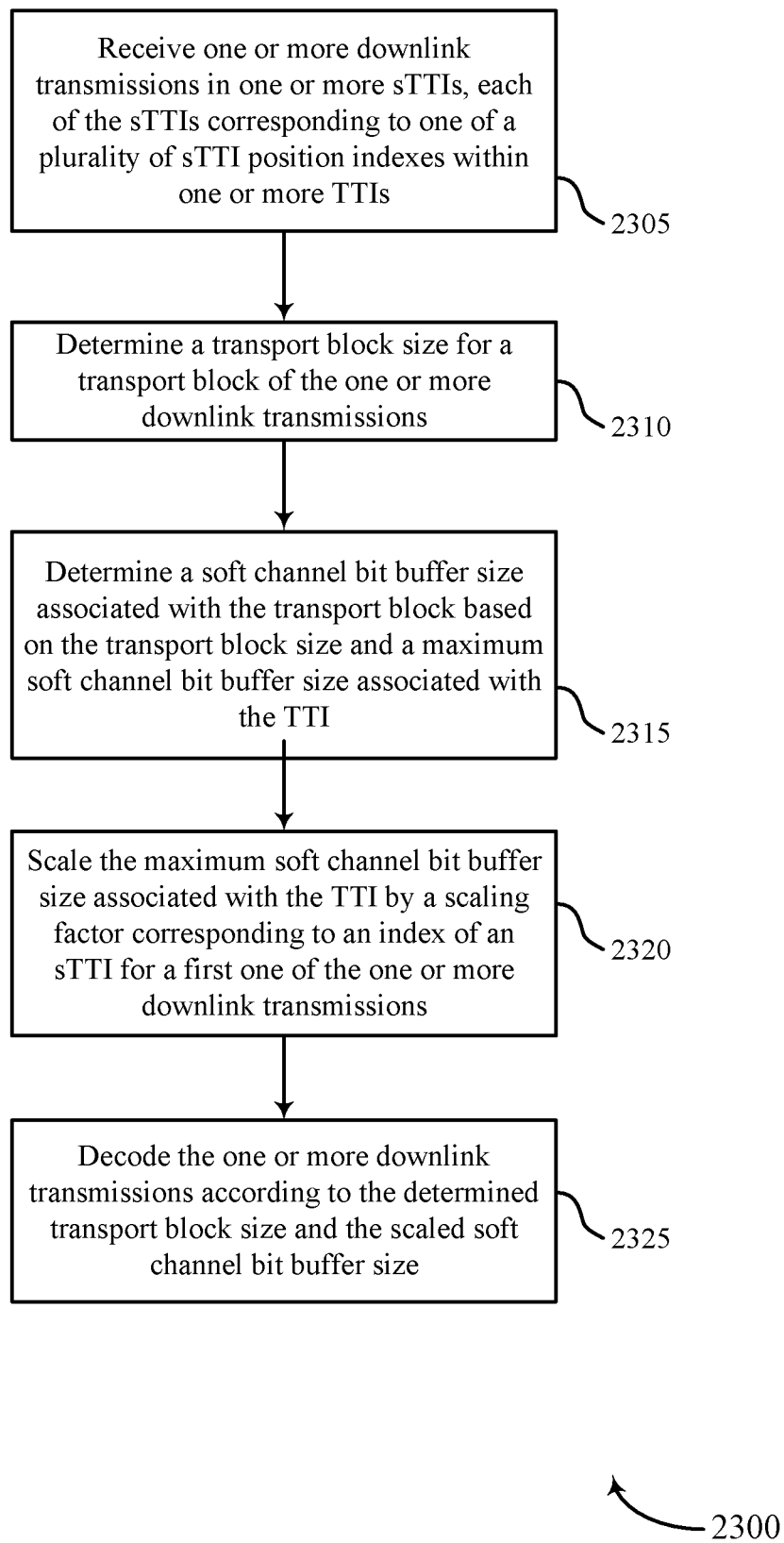

FIG. 23 shows a flowchart illustrating a method 2300 for determining transport block size, soft channel bit buffer size, and rate matching for sTTIs in accordance with aspects of the present disclosure. The operations of method 2300 may be implemented by a UE 115 or its components as described herein. For example, the operations of method 2300 may be performed by a UE sTTI handling module as described with reference to FIGS. 5 through 12. In some examples, a UE 115 may execute a set of codes to control the functional elements of the device to perform the functions described below. Additionally or alternatively, the UE 115 may perform aspects of the functions described below using special-purpose hardware.

At 2305 the UE 115 may receive one or more downlink transmissions in one or more sTTIs, each of the sTTIs corresponding to one of a plurality of sTTI position indexes within one or more TTIs. The operations of 2305 may be performed according to the methods described herein. In certain examples, aspects of the operations of 2305 may be performed by a downlink reception component as described with reference to FIGS. 5, 6, 11, and 12.

At 2310 the UE 115 may determine a transport block size for a transport block of the one or more downlink transmissions. The operations of 2315 may be performed according to the methods described herein. In certain examples, aspects of the operations of 2315 may be performed by a transport block size determination component as described with reference to FIGS. 5, 6, 11, and 12.

At 2315 the UE 115 may determine a soft channel bit buffer size associated with the transport block based on the transport block size and a maximum soft channel bit buffer size associated with the TTI. The operations of 2110 may be performed according to the methods described herein. In certain examples, aspects of the operations of 2315 may be performed by a soft channel bit buffer size determination component as described with reference to FIGS. 5 and 10 through 12.

At 2320 the UE 115 may scale the maximum soft channel bit buffer size associated with the TTI by a scaling factor corresponding to an index of an sTTI for a first one of the one or more downlink transmissions. The operations of 2320 may be performed according to the methods described herein. In certain examples, aspects of the operations of 2320 may be performed by a scaling component as described with reference to FIGS. 5 and 11.

At 2325 the UE 115 may decode the one or more downlink transmissions according to the determined transport block size and the scaled soft channel bit buffer size. The operations of 2325 may be performed according to the methods described herein. In certain examples, aspects of the operations of 2320 may be performed by a decoding component as described with reference to FIGS. 5, 6, 11, and 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTR), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a plurality of downlink transmissions corresponding to a transport block in a plurality of transmission time intervals (TTIs), wherein at least two of the plurality of TTIs correspond to different TTI types;
determining a first soft channel bit buffer size associated with the transport block based at least in part on a first TTI length of an initial downlink transmission of the plurality of downlink transmissions, wherein the initial downlink transmission is associated with a first decoding operation of respective decoding operations associated with the plurality of downlink transmissions; and
decoding the plurality of downlink transmissions according to the first soft channel bit buffer size.

2. The method of claim 1, further comprising:
identifying that a second decoding operation of the respective decoding operations is associated with a second transmission in a shorter TTI than a first transmission associated with the first decoding operation;
identifying a subset of a plurality of soft channel bits for at least one of the plurality of downlink transmissions; and
storing the plurality of soft channel bits excluding the subset of the plurality of soft channel bits in a soft channel bit buffer based at least in part on the identifying that the second decoding operation is associated with the second transmission in the shorter TTI.

3. The method of claim 1, further comprising:
combining one or more soft channel bits from respective ones of the decoded plurality of downlink transmissions.

4. The method of claim 1, wherein the different TTI types comprise a one subframe TTI, a one slot short TTI (sTTI), a two or three symbol sTTI, or any combination thereof.

5. An apparatus for wireless communication, comprising:
a processor;
memory in electronic communication with the processor; and
instructions stored in the memory and executable by the processor to cause the apparatus to:
receive a plurality of downlink transmissions corresponding to a transport block in a plurality of transmission time intervals (TTIs), wherein at least two of the plurality of TTIs correspond to different TTI types;
determine a first soft channel bit buffer size associated with the transport block based at least in part on a first TTI length of an initial downlink transmission of the plurality of downlink transmissions, wherein the initial downlink transmission is associated with a first decoding operation of respective decoding operations associated with the plurality of downlink transmissions; and
decode the plurality of downlink transmissions according to the first soft channel bit buffer size.

6. The apparatus of claim 5, wherein the instructions are further executable by the processor to cause the apparatus to:
identify that a second decoding operation of the respective decoding operations is associated with a second transmission in a shorter TTI than a first transmission associated with the first decoding operation; and
identify a subset of a plurality of soft channel bits for at least one of the plurality of downlink transmissions; and
store the plurality of soft channel bits excluding the subset of the plurality of soft channel bits in a soft channel bit buffer based at least in part on the identifying that the second decoding operation is associated with the second transmission in the shorter TTI.

7. The apparatus of claim 5, wherein the instructions are further executable by the processor to cause the apparatus to:
combine one or more soft channel bits from respective ones of the decoded plurality of downlink transmissions.

8. The apparatus of claim 5, wherein the different TTI types comprise a one subframe TTI, a one slot short TTI (sTTI), a two or three symbol sTTI, or any combination thereof.

9. An apparatus for wireless communication, comprising:
means for receiving a plurality of downlink transmissions corresponding to a transport block in a plurality of transmission time intervals (TTIs), wherein at least two of the plurality of TTIs correspond to different TTI types;
means for determining a first soft channel bit buffer size associated with the transport block based at least in part on a first TTI length of an initial downlink transmission of the plurality of downlink transmissions, wherein the initial downlink transmission is associated with a first decoding operation of respective decoding operations associated with the plurality of downlink transmissions; and means for decoding the plurality of downlink transmissions according to the first soft channel bit buffer size.

10. The apparatus of claim 9, further comprising:

means for identifying that a second decoding operation of the plurality of decoding operations is associated with a second transmission in a shorter TTI than a first transmission associated with the first decoding operation; and means for identifying a subset of a plurality of soft channel bits for at least one of the plurality of downlink transmissions; and means for storing the plurality of soft channel bits excluding the subset of the plurality of soft channel bits in a soft channel bit buffer based at least in part on the means for identifying that the second decoding operation is associated with the second transmission in the shorter TTI.

11. The apparatus of claim 9, further comprising:

combining one or more soft channel bits from respective ones of the decoded plurality of downlink transmissions.

12. The apparatus of claim 9, wherein the different TTI types comprise a one subframe TTI, a one slot short TTI (sTTI), a two or three symbol sTTI, or any combination thereof.

13. A non-transitory computer-readable medium storing code for wireless communications at a transmitting device, the code comprising instructions executable by a processor to:

receive a plurality of downlink transmissions corresponding to a transport block in a plurality of transmission time intervals (TTIs), wherein at least two of the plurality of TTIs correspond to different TTI types;

determine a first soft channel bit buffer size associated with the transport block based at least in part on a first TTI length of an initial downlink transmission of the plurality of downlink transmissions, wherein the initial downlink transmission is associated with a first decoding operation of respective decoding operations associated with the plurality of downlink transmissions; and decode the plurality of downlink transmissions according to the first soft channel bit buffer size.

14. The non-transitory computer-readable medium of claim 13, wherein the instructions are further executable to:

identify that a second decoding operation of the respective decoding operations is associated with a second transmission in a shorter TTI than a first transmission associated with the first decoding operation; and identify a subset of a plurality of soft channel bits for at least one of the plurality of downlink transmissions; and store the plurality of soft channel bits excluding the subset of the plurality of soft channel bits in a soft channel bit buffer based at least in part on the identifying that the second decoding operation is associated with the second transmission in the shorter TTI.

15. The non-transitory computer-readable medium of claim 13, wherein the instructions are further executable to:

combine one or more soft channel bits from respective ones of the decoded plurality of downlink transmissions.

16. The non-transitory computer-readable medium of claim 13, wherein the different TTI types comprise a one subframe TTI, a one slot short TTI (sTTI), a two or three symbol sTTI, or any combination thereof.

* * * * *